United States Patent
Qin et al.

(10) Patent No.: US 12,536,196 B2
(45) Date of Patent: Jan. 27, 2026

(54) DISTRIBUTED DATA PROCESSING

(71) Applicant: Alipay (Hangzhou) Information Technology Co., Ltd., Zhejiang (CN)

(72) Inventors: Wei Qin, Hangzhou (CN); Jiping Yu, Hangzhou (CN); Xiaowei Zhu, Hangzhou (CN); Wenguang Chen, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 90 days.

(21) Appl. No.: 18/544,666

(22) Filed: Dec. 19, 2023

(65) Prior Publication Data

US 2024/0134881 A1    Apr. 25, 2024

Related U.S. Application Data

(63) Continuation of application No. PCT/CN2022/125675, filed on Oct. 17, 2022.

(30) Foreign Application Priority Data

Oct. 20, 2021    (CN) .......................... 202111218593.5

(51) Int. Cl.
*G06F 16/00* (2019.01)
*G06F 16/27* (2019.01)

(52) U.S. Cl.
CPC .................................. *G06F 16/273* (2019.01)

(58) Field of Classification Search
CPC .................................................. G06F 16/273
(Continued)

(56) References Cited

U.S. PATENT DOCUMENTS

| 8,645,429 B1 | 2/2014 | Bik et al. |
| 2014/0195510 A1 | 7/2014 | Jourdan et al. |

(Continued)

FOREIGN PATENT DOCUMENTS

| CN | 103914556 | 7/2014 |
| CN | 105224528 | 1/2016 |

(Continued)

OTHER PUBLICATIONS

International Preliminary Report on Patentability in International Appln. No. PCT/CN2022/125675, mailed on May 2, 2024, 12 pages (with English translation).

(Continued)

*Primary Examiner* — Alexandria Y Bromell
(74) *Attorney, Agent, or Firm* — Fish & Richardson P.C.

(57) ABSTRACT

Embodiments of this specification provide distributed data processing methods, apparatuses, and devices. One method includes: determining an active vertex set that currently participates in data processing in target graph data, in response to determining that an external memory of a first distributed node stores an active vertex in the active vertex set, determining, from a plurality of predetermined data processing modes, a target data processing mode that matches the active vertex set, determining, based on the target data processing mode, a to-be-updated vertex according to the association relationship with the active vertex, and sending, based on first data of the active vertex in the external memory, a first update message to a target distributed node in which the to-be-updated vertex is located.

18 Claims, 11 Drawing Sheets

(58) Field of Classification Search
USPC .......................................................... 707/615
See application file for complete search history.

(56) References Cited

U.S. PATENT DOCUMENTS

| | | |
|---|---|---|
| 2020/0133663 A1 | 4/2020 | Dwars et al. |
| 2020/0210481 A1 | 7/2020 | Niebielski et al. |
| 2021/0073287 A1* | 3/2021 | Hunter .................. H04L 63/123 707/707 |

FOREIGN PATENT DOCUMENTS

| | | |
|---|---|---|
| CN | 106815080 | 6/2017 |
| CN | 108132838 | 6/2018 |
| CN | 110442754 | 11/2019 |
| CN | 110737804 | 1/2020 |
| CN | 111737540 | 10/2020 |
| CN | 113065035 | 7/2021 |
| CN | 113656426 | 11/2021 |
| CN | 114637756 | 6/2022 |

OTHER PUBLICATIONS

International Search Report and Written Opinion in International Appln. No. PCT/CN2022/125675, mailed on Jan. 3, 2023, 14 pages (with English translation).

* cited by examiner

DISTRIBUTED DATA PROCESSING

CROSS-REFERENCE TO RELATED APPLICATIONS

This application is a continuation of PCT Application No. PCT/CN2022/125675, filed on Oct. 17, 2022, which claims priority to Chinese Patent Application No. 202111218593.5, filed on Oct. 20, 2021, and each application is hereby incorporated by reference in its entirety.

TECHNICAL FIELD

This document relates to the field of data processing technologies, and in particular, to distributed data processing methods, apparatuses, and devices.

BACKGROUND

Because a data processing manner in a single machine does not involve network communication and data interaction, there are advantages such as simple and convenient data processing and high performance. Based on the advantages, the data processing manner in a single machine also becomes a current mainstream data processing manner. However, with rapid development of Internet technologies, data scales in various industries increase drastically, and a relatively large quantity of resources are needed for data processing. In a current mainstream data processing manner in a single machine, a current big data processing need cannot be satisfied due to limited resources.

SUMMARY

An embodiment of this specification provides a distributed data processing method. The method includes: determining an active vertex set that currently participates in data processing in target graph data, where the target graph data are pre-generated based on event information of a plurality of associated target events, the event information includes a plurality of event elements of the corresponding target events, each vertex of the target graph data corresponds to one of the event elements, and each edge of the target graph data is connected to the vertex with an association relationship; if an external memory of a first distributed node stores any active vertex in the active vertex set, determining a target data processing mode that matches the active vertex set in a plurality of predetermined data processing modes; determining, based on the target data processing mode, a to-be-updated vertex that has the association relationship with the any active vertex; and sending, based on first data of the any active vertex in the external memory, a first update message to a target distributed node in which the to-be-updated vertex is located, so that the target distributed node performs update processing on second data of the to-be-updated vertex in the external memory of the target distributed node based on the first update message.

An embodiment of this specification provides a distributed data processing apparatus. The apparatus includes a first determining module, configured to determine an active vertex set that currently participates in data processing in target graph data. The target graph data are pre-generated based on event information of a plurality of associated target events, the event information includes a plurality of event elements of the corresponding target events, each vertex of the target graph data corresponds to one of the event elements, and each edge of the target graph data is connected to the vertex with an association relationship. The apparatus further includes a second determining module, configured to: if an external memory of a first distributed node stores any active vertex in the active vertex set, determine a target data processing mode that matches the active vertex set in a plurality of predetermined data processing modes. The apparatus further includes a third determining module, configured to determine, based on the target data processing mode, a to-be-updated vertex that has the association relationship with the any active vertex. The apparatus further includes a sending module, configured to send, based on first data of the any active vertex in the external memory, a first update message to a target distributed node in which the to-be-updated vertex is located, so that the target distributed node performs update processing on second data of the to-be-updated vertex in the external memory of the target distributed node based on the first update message.

An embodiment of this specification provides a distributed data processing device. The device includes a processor. The device further includes a memory, configured to store computer-executable instructions. When the computer-executable instructions are executed, the processor is enabled to perform the following operations: determining an active vertex set that currently participates in data processing in target graph data, where the target graph data are pre-generated based on event information of a plurality of associated target events, the event information includes a plurality of event elements of the corresponding target events, each vertex of the target graph data corresponds to one of the event elements, and each edge of the target graph data is connected to the vertex with an association relationship; if an external memory of a first distributed node stores any active vertex in the active vertex set, determining a target data processing mode that matches the active vertex set in a plurality of predetermined data processing modes; determining, based on the target data processing mode, a to-be-updated vertex that has the association relationship with the any active vertex; and sending, based on first data of the any active vertex in the external memory, a first update message to a target distributed node in which the to-be-updated vertex is located, so that the target distributed node performs update processing on second data of the to-be-updated vertex in the external memory of the target distributed node based on the first update message.

An embodiment of this specification provides a storage medium. The storage medium is configured to store computer-executable instructions. When the computer-executable instructions are executed by a processor, the following procedure is performed: determining an active vertex set that currently participates in data processing in target graph data, where the target graph data are pre-generated based on event information of a plurality of associated target events, the event information includes a plurality of event elements of the corresponding target events, each vertex of the target graph data corresponds to one of the event elements, and each edge of the target graph data is connected to the vertex with an association relationship; if an external memory of a first distributed node stores any active vertex in the active vertex set, determining a target data processing mode that matches the active vertex set in a plurality of predetermined data processing modes; determining, based on the target data processing mode, a to-be-updated vertex that has the association relationship with the any active vertex; and sending, based on first data of the any active vertex in the external memory, a first update message to a target distributed node in which the to-be-updated vertex is located, so that the target distributed node performs update processing on second data of the to-be-updated vertex in the external memory of the target distributed node based on the first update message.

DESCRIPTION OF EMBODIMENTS

To improve big data processing efficiency, in this specification, big data are converted into a graph form for processing, to perform association and centralized processing on data that have an association relationship. Specifically, corresponding graph data are generated based on event information of a plurality of associated events. The graph data include a plurality of vertexes and a plurality of edges, the event information includes a plurality of event elements of a corresponding event, each vertex of the graph data corresponds to one event element, each edge of the graph data is connected to a vertex with an association relationship, and two vertexes connected by an edge are adjacent vertexes.

The graph data can be represented as G=(V, E). Here, G represents graph data, that is, a graph, V represents a set of all vertexes in the graph G, and E represents a set of all edges in the graph G. Here, u and v represent any two vertexes in V, that is, u, v∈V. An edge between any two vertexes can be represented by e, for example, an edge e between the vertex u and the vertex v can be represented as e=(u, v).

The edge can have a direction, or can have no direction. An edge having a direction can be referred to as a directed edge, and an edge having not direction can be referred to as an undirected edge. A graph including the directed edge can be referred to as a directed graph, and a graph including the undirected edge can be referred to as an undirected graph.

The directed edge points from an ingress point to an egress point. The ingress point can also be referred to as a source (source, or src for short) vertex, and the egress point can also be referred to as a destination (destination, or dst for short) vertex. The ingress point and the egress point are used for description below. For the ingress point, the directed edge can be referred to as an egress edge of the ingress point. For the egress point, the directed edge can be referred to as an ingress edge of the egress point. For example, the edge e=(u, v) can represent that the edge e is a directed edge pointing from the vertex u (ingress point) to the vertex v (egress point). For the vertex u, the edge e is an egress edge; and for the vertex v, the edge e is an ingress edge.

The undirected edge can be converted into two directed edges in different directions. For example, the edge e can be an undirected edge between the vertex u and the vertex v. The edge e can be converted into two directed edges e1 and e2. The edge e1 can be an edge pointing from the vertex u to the vertex v, and is represented as e1=(u, v). The edge e2 can be an edge pointing from the vertex v to the vertex u, and is represented as e2=(v, u).

Figure 1:
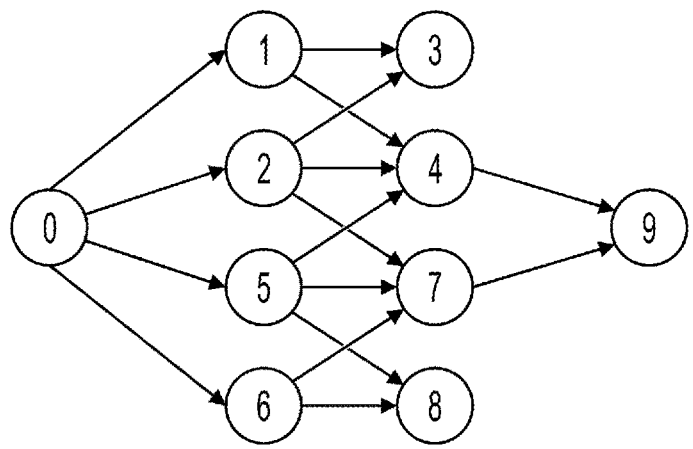
FIG. 1 is a schematic diagram illustrating graph data, according to an embodiment of this specification.

The undirected edge can be converted into a directed edge. Therefore, in this embodiment of this specification, graph data including the directed edge is used for description. For a processing manner of the graph data including the undirected edge, references can be made to a processing manner of the graph data including the directed edge. For ease of understanding, this embodiment of this specification provides a schematic diagram of graph data including the directed edge. As shown in FIG. 1, it can be determined from FIG. 1 that the graph data include 10 vertexes and 16 edges. For ease of describing each vertex, a sequence number is used for distinguishing in this specification.

Figure 2:
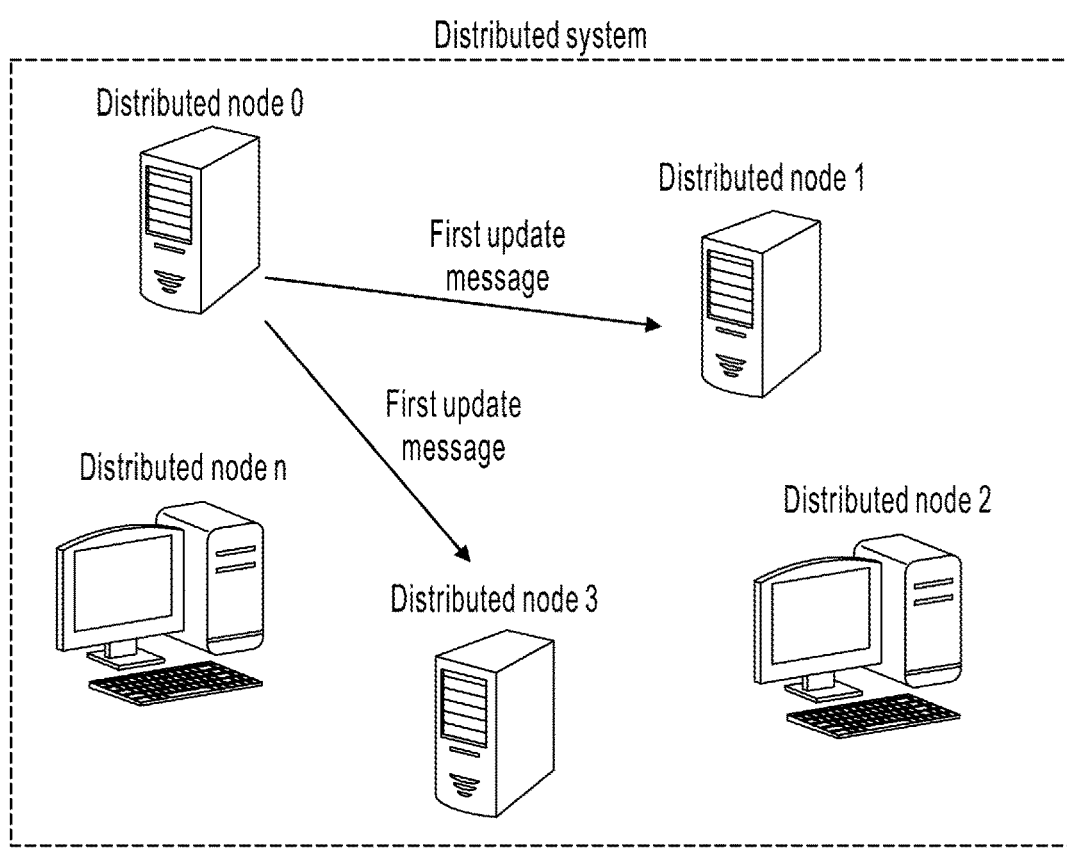
FIG. 2 is a schematic diagram illustrating a scenario of a distributed data processing method, according to an embodiment of this specification.

In consideration that in an existing data processing manner in a single machine, a big data processing need cannot be satisfied due to limited resources, based on this, a distributed data processing system (briefly referred to as a distributed system below) is used to perform distributed processing on the graph data in this embodiment of this specification. FIG. 2 is a schematic diagram illustrating a scenario of a distributed data processing method, according to an embodiment of this specification. As shown in FIG. 2, the scenario includes n distributed nodes in a distributed system. Here, n is an integer greater than 1. The distributed node can be a terminal device such as a mobile phone, a tablet computer, a desktop computer, or a portable notebook computer (only a desktop computer is shown in FIG. 2). The distributed node can be a server.

Specifically, target graph data are pre-generated based on event information of a plurality of associated target events. The target graph data include a plurality of nodes and a plurality of edges, the event information includes a plurality of event elements of the corresponding target events, each vertex of the target graph data corresponds to one event element, and each edge of the target graph data is connected to a vertex with an association relationship. For ease of description, a distributed node 0 in the distributed system is referred to as a first distributed node. The first distributed node iteratively determines an active vertex set that currently participates in data processing in target graph data; and if it is determined that an external memory of a first distributed node stores any active vertex in the active vertex set, determines a target data processing mode that matches the active vertex set in a plurality of predetermined data processing modes. The first distributed node determines, based on the target data processing mode, a to-be-updated vertex that has an association relationship with the any active vertex; and sends, based on first data of the any active vertex in the external memory of the first distributed node, a first update message to a target distributed node in which the determined to-be-updated vertex is located, so that the target distributed node performs update processing on second data of the to-be-updated vertex in the external memory of the target distributed node based on the first update message.

It can be understood that, the first distributed node is not limited to the distributed node 0, and can be any distributed node in the distributed system. Each distributed node in the distributed system processes the target graph data in the above-mentioned data processing manner of the first distributed node. Therefore, the target graph data are generated based on the event information of the plurality of associated target events, and data processing is performed based on the target graph data, to not only implement effective association of data in big data and centralized processing of associated data, but also improve data processing efficiency. A distributed data processing system is used, and related data of the target graph data are stored in an external memory of each distributed node, to not only implement effective expansion of a memory, but also satisfy big data processing need and ensure data processing efficiency, because the distributed node can perform data processing in parallel. In addition, the distributed data processing system supports a plurality of data processing modes, and a target data processing mode that matches a current active vertex set is determined, to not only improve data processing performance of the distributed data processing system, but also further improve data processing efficiency.

Figure 3:
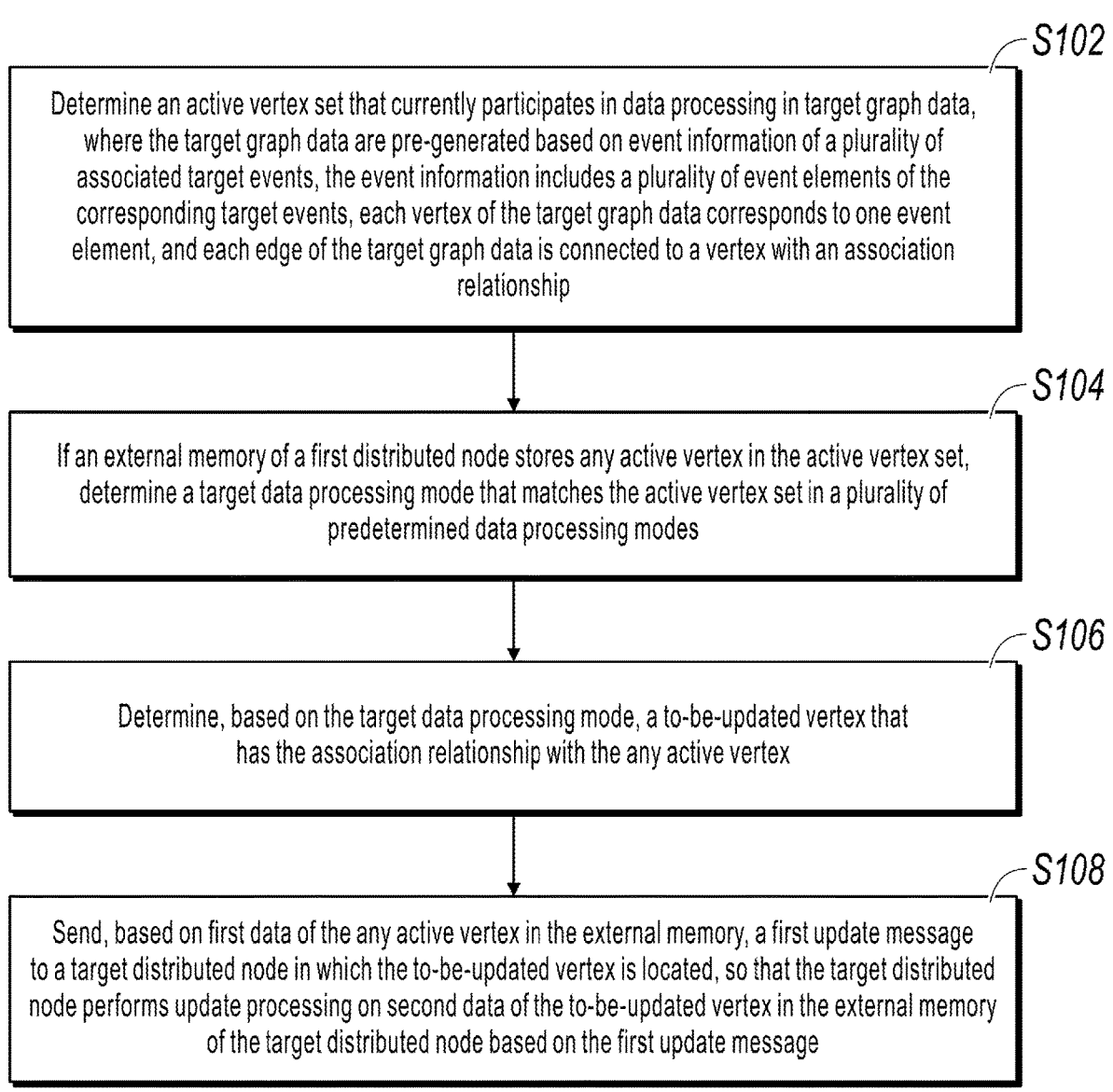
FIG. 3 is a first schematic flowchart illustrating a distributed data processing method, according to an embodiment of this specification.

Based on an architecture of the above-mentioned application scenario, an embodiment of this specification provides a distributed data processing method. FIG. 3 is a schematic flowchart illustrating a distributed data processing method, according to an embodiment of this specification. The method in FIG. 3 can be performed by the first distributed node in FIG. 2. As shown in FIG. 3, the method includes the following steps.

Step S102: Determine an active vertex set that currently participates in data processing in target graph data, where the target graph data are pre-generated based on event information of a plurality of associated target events, the event information includes a plurality of event elements of the corresponding target events, each vertex of the target graph data corresponds to one event element, and each edge of the target graph data is connected to a vertex with an association relationship. Because there is a certain dependency relationship between all event elements of the plurality of associated target events, that is, at least one event element changes with at least one another event element, in this specification, a vertex corresponding to the at least one another event element is referred to as an active vertex that participates in data processing, and the active vertex forms an active vertex set. It can be understood that, the active vertex set can include one or more active vertexes.

Usually, because the target graph data include a plurality of vertexes, one time of processing of the target graph data usually includes a plurality of rounds of iteration. For the first round of iteration, a user can operate a certain distributed node to input the active vertex set. After obtaining the active vertex set input by the user, the distributed node sends a related message of the active vertex set to each distributed node in the distributed system in which the distributed node is located, so that each distributed node determines the active vertex set corresponding to the related message as the active vertex set that currently participates in data processing in the target graph data. After the first round of iteration processing is completed, the active vertex set can be automatically updated based on a processing result. For an update process of the active vertex set, references can be made to the following related descriptions. It is worthwhile to note that, one time of processing of the target graph data can alternatively include only one round of iteration. For example, after the first round of iteration, if it is determined that no active vertex set exists, it is determined that processing of the target graph data ends.

The target event can be set independently based on needs in actual applications. No specific limitation is imposed in this specification. It can be understood that, the event information and the event element can vary with the target event. In a feasible implementation, the target event can be a resource transfer event. Correspondingly, the event element can be a resource transfer-out account, a resource transfer-in account, etc. The event information can include account information of the resource transfer-out account, account information of the resource transfer-in account, etc., and an edge can indicate a resource transfer path. In another feasible implementation, the target event can be a reference event of an academic document (for example, a paper or a patent document). Correspondingly, the event element can be a reference academic document, a referenced academic document, etc. The event information can include file information of the reference academic document, file information of the referenced academic document, etc. The edge can represent a reference relationship between different academic documents. In still another feasible implementation, the target event can be a product flow event. Correspondingly, the event element can include a product flow-out place, a product flow-in place, etc. The event information can include information about the product flow-out place, information about the product flow-in place, etc. The edge can represent a product flow path. For an event type of the target event, descriptions are not listed in this specification. It can be understood that, each event element can be divided into a plurality of levels, and the event element "product flow-out place" is used as an example for description. The event element can include a level-1 product flow-out place (for example, a product manufacturer), a level-2 product flow-out place (for example, a warehouse in a certain province), a level-3 product flow-out place (for example, a warehouse in a certain city), a level-4 product flow-out place (for example, a warehouse in a certain region of a certain city), a level-5 product flow-out place (for example, a sales point in a certain region of a certain city), etc.

Step S104: If an external memory of the first distributed node stores any active vertex in the active vertex set, determine a target data processing mode that matches the active vertex set in a plurality of predetermined data processing modes.

In consideration that memory space of the distributed node is limited, to implement memory expansion and improve data processing efficiency, in an embodiment of this specification, division processing is performed on the target graph data in advance, so that each vertex and each edge of the target graph data are stored in an external memory of each distributed node in a distributed manner, and subsequent processing is performed when the first distributed node determines that any active vertex in the active vertex set is stored in the external memory of the first distributed node. For example, if the active vertex set includes a vertex 1, a vertex 3, and a vertex 4, and the external memory of the first distributed node stores the vertex 3 and a vertex 5, the first distributed node continues to perform a subsequent operation, to process related data of the vertex 3.

Step S106: Determine, based on the target data processing mode, a to-be-updated vertex that has the association relationship with the any active vertex.

There are different determining manners of the to-be-updated vertex in different data processing modes provided in this specification, and references can be made to the following related descriptions.

Step S108: Send, based on first data of any active vertex in the external memory, first update message to a target distributed node in which the to-be-updated vertex is located, so that the target distributed node performs update processing on second data of the to-be-updated vertex in the external memory of the target distributed node based on the first update message.

In an embodiment of this specification, the active vertex set that currently participates in data processing in the target graph data is determined; if the external memory of the first distributed node stores the any active vertex in the active vertex set, the target data processing mode that matches the active vertex set in the plurality of predetermined data processing modes is determined; the to-be-updated vertex that has the association relationship with the any active vertex is determined based on the target data processing mode; and the first update message is sent, based on the first data of the any active vertex in the external memory, to the target distributed node in which the to-be-updated vertex is located, so that the target distributed node performs update processing on the second data of the to-be-updated vertex in the external memory of the target distributed node based on the first update message. Therefore, the target graph data are generated based on the event information of the plurality of associated target events, and data processing is performed based on the target graph data, to not only implement effective association of data in big data and centralized processing of associated data and avoid data omission, but also improve data processing efficiency. A distributed data processing system is used, and related data of the target graph data are stored in an external memory of each distributed node, to not only implement effective expansion of a memory, but also satisfy big data processing need and ensure data processing efficiency, because the distributed node can perform data processing in parallel. In addition, the distributed data processing system supports a plurality of data processing modes, and a target data processing mode that matches a current active vertex set is determined, to not only improve data processing performance of the distributed data processing system, but also further improve data processing efficiency.

To implement distributed data processing, in an embodiment of this specification, a specified device can perform division processing on the target graph data in a predetermined data division manner, and send, to a corresponding distributed node in the distributed data processing system, shard data obtained through division processing. Correspondingly, before step S102, the following steps can be further included:

receiving shard data and attribute information of target graph data that are sent by a specified device, where the shard data are obtained by the specified device by performing division processing on the target graph data in a predetermined data division manner; and storing the received shard data and the received attribute information in the external memory of the first distributed node.

In an embodiment of this specification, preprocessing permission can be further allocated to the distributed node in the distributed data processing system in advance, and a distributed node that has the preprocessing permission performs division processing on the target graph data, and then send the divided target graph data to each distributed node in the distributed data processing system. Correspondingly, before step S102, the following steps can be further included:

if it is determined that the first distributed node has preprocessing permission, performing division processing on the target graph data in the predetermined data division manner, to obtain shard data to be allocated to each distributed node in a distributed system in which the first distributed node is located; and sending the shard data and the attribute information of the target graph data to each distributed node in the distributed system, so that the distributed node stores the shard data and the attribute information in the external memory.

When the first distributed node receives shard data and the attribute information of the target graph data that are sent by the first distributed node to the first distributed node, the first distributed node stores the received shard data and the received attribute information in the external memory of the first distributed node.

The shard data can include a vertex subset, an ingress edge set corresponding to an ingress edge of each vertex in the vertex subset, an egress edge set corresponding to an egress edge of each vertex in the vertex subset, a primary backup of each vertex in the vertex subset, an image backup of a vertex that forms the directed edge with each vertex in the vertex subset, etc., the primary backup includes element data of an event element corresponding to a corresponding vertex, and the image backup is used to transfer a message. The second data can include the primary backup. The element data vary with the event element. For example, the event element is a resource transfer-out account, and the element data can include a total quantity of resources in the resource transfer-out account, resource transfer-out data existing each time a resource is transferred out, resource transfer-in data existing when the event element serves as a resource transfer-in account, etc. For another example, the event element is a product flow-out place, and the element data can include a total quantity of products in the product flow-out place, a quantity of flow-out products, a product flow-in place, etc.

The attribute information of the target graph data can include a first quantity of edges of the target graph data, a second quantity of egress edges of each vertex in the target graph data, etc.

Figure 4A:
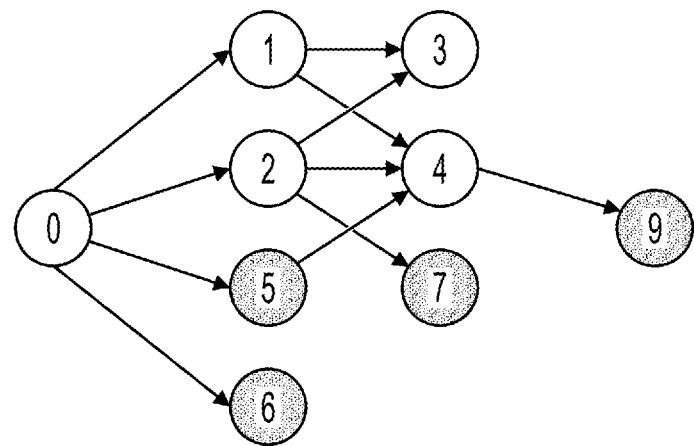
FIG. 4a and FIG. 4b each are a schematic diagram illustrating graph data corresponding to shard data, according to an embodiment of this specification.
Figure 4B:
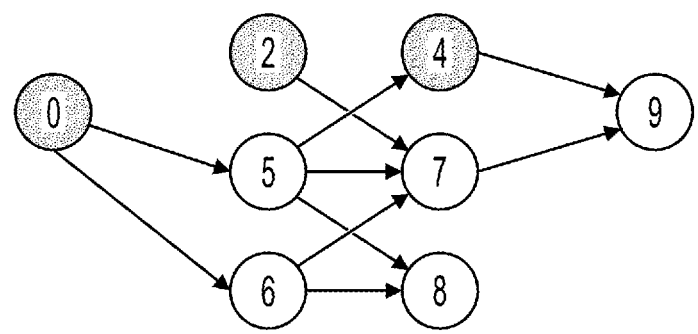

For ease of understanding, descriptions are provided by using an example in which the graph data shown in FIG. 1 are used as the target graph data, and the distributed system includes a distributed node 0 and a distributed node 1. The predetermined data division manner can be a continuous block division manner, a vertex 0 to a vertex 4 are classified into the distributed node 0, and a vertex 5 to a vertex 9 are classified into the distributed nodes 1. Correspondingly, shard data stored in an external memory of the distributed node 0 can include a vertex subset V_0{0, 1, 2, 3, 4}, an egress edge set Eout_0{(0, 1), (0, 2), (1, 3), (1, 4), (2, 3), (2, 4), (5, 4)}, and an ingress edge set Ein_0{(1, 0), (2, 0), (5, 0), (6, 0), (3, 1), (4, 1), (3, 2), (4, 2), (7, 2), (9, 4)} that are obtained through division. Shard data stored in an external memory of the distributed node 1 can include a vertex subset V_{5, 6, 7, 8, 9}, an egress edge set Eout_1{(0, 5), (0, 6), (2, 7), (4, 9), (5, 7), (5, 8), (6, 7), (6, 8), (7, 9)}, and an ingress edge set Ein_1{(4, 5), (7, 5), (8, 5), (7, 6), (8, 6), (9, 7)} that are obtained through division. In the egress edge set, a representation manner of each edge can be that an ingress point is before an egress point; and in the ingress edge set, a representation manner of each edge can be that an egress point is before an ingress point. It can be understood that, the egress edge set and the ingress edge set both indicate an edge pointing from the ingress point to the egress point. The shard data stored in the external memory of the distributed node 0 and the external memory of the distributed node 1 can respectively correspond to graph data shown in FIG. 4a and FIG. 4b. A white vertex is a vertex corresponding to the primary backup, that is, a vertex in a vertex subset stored in an external memory of a distributed node. A black vertex represents a vertex corresponding to the image backup.

Division processing is performed on the target graph data, and the shard data obtained through division is stored in the external memory of the distributed node, so that not only effective expansion of a memory is implemented, but also each distributed node can perform data processing in parallel. In comparison with an existing data processing manner in a memory of a single machine, in this embodiment of this specification, data processing efficiency is improved, data processing pressure in the single machine is reduced, and a big data processing need can be satisfied. It is worthwhile to note that, in actual applications, division processing can alternatively be manually performed on the target graph data, and the shard data obtained through division and the attribute information of the target graph data are predetermined in the external memory of each distributed node.

Figure 5:
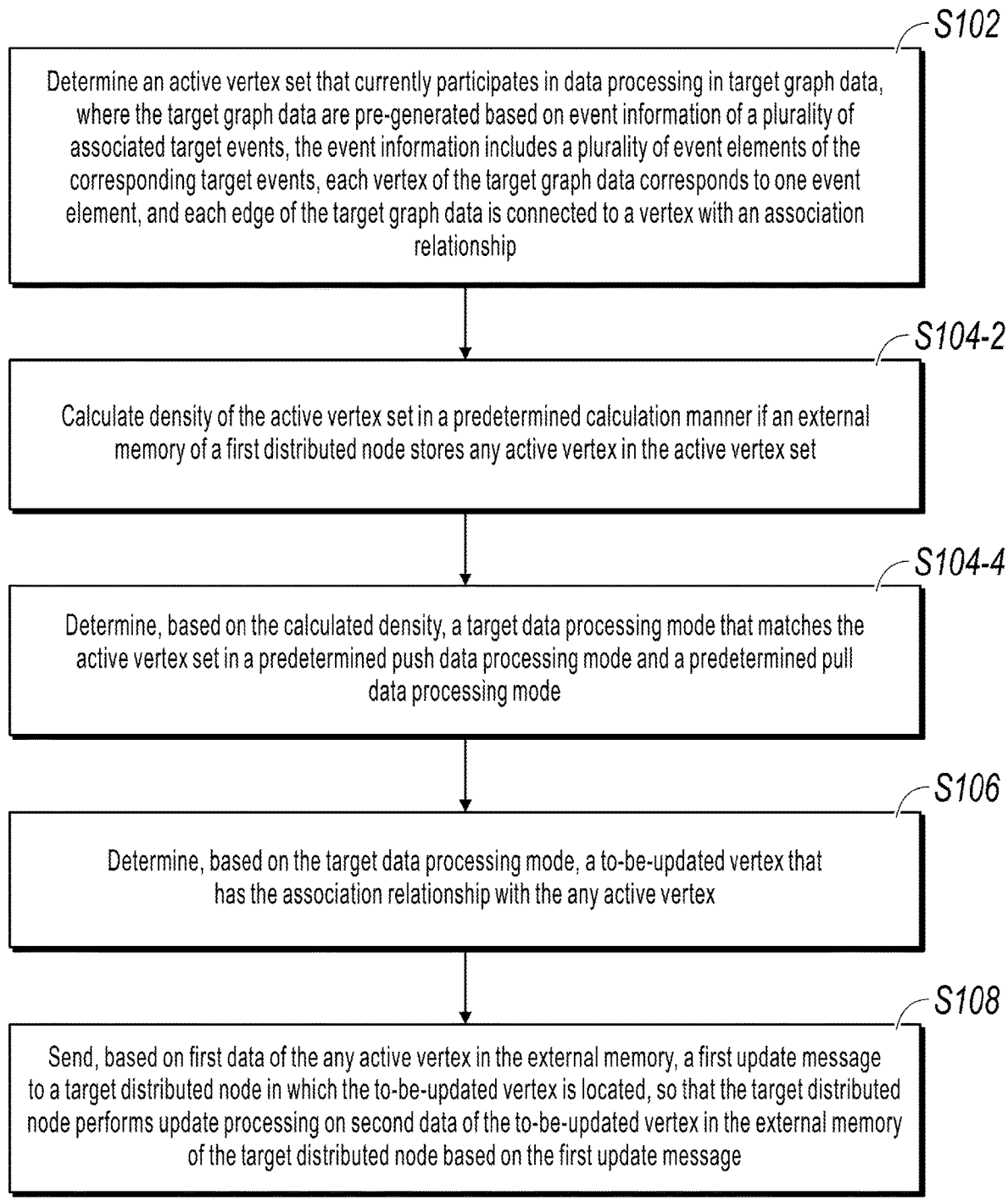
FIG. 5 is a second schematic flowchart illustrating a distributed data processing method, according to an embodiment of this specification.

To improve processing efficiency of the active vertex set that currently participates in data processing, in an embodiment of this specification, a matched target data processing manner is determined based on density of the active vertex set. Specifically, as shown in FIG. 5, step S104 can include steps S104-2 and S104-4. Step S104-2: Calculate the density of the active vertex set in a predetermined calculation manner if the external memory of the first distributed node stores the any active vertex in the active vertex set. Specifically, a third quantity of active vertexes in the active vertex set is counted; a total quantity of egress edges of each active vertex in the active vertex set is counted based on the second quantity stored in the external memory of the first distributed node, and the total quantity is determined as a fourth quantity; and the density of the active vertex set is determined based on the third quantity and the fourth quantity in the predetermined calculation manner That the density of the active vertex set is determined based on the third quantity and the fourth quantity in the predetermined calculation manner can include: calculating a sum of the third quantity and the fourth quantity, and determining a calculation result as the density of the active vertex set.

In each data mode provided in this embodiment of this specification, there can be two search manners based on different search paths for target map data: a breadth-first search and a depth-first search. For specific search processes of the breadth-first search and the depth-first search, references can be made to the conventional technology, and details are omitted here. In this specification, the breadth-first search is used as an example for description. For example, in a process of the first round of iteration, a determined active vertex set is {0}, that is, the active vertex set includes only the vertex 0; the third quantity of active vertexes in the active vertex set is counted as 1; the total quantity of egress edges of each active vertex in the active vertex set is counted as a total quantity 4 of egress edges of the vertex 0 based on the second quantity stored in the external memory of the first distributed node; and the calculated density of the active vertex set is 1+4=5. For another example, after the first round of iteration ends, an active vertex set that corresponds to the second round of iteration and that is determined based on the target graph data shown in FIG. 1 is {1, 2, 5, 6}, that is, the active vertex set includes only the vertex 1, the vertex 2, the vertex 5, and the vertex 6; a third quantity is counted as 4, and the fourth quantity is counted as 10; and the calculated density is 4+10=14.

Step S104-4: Determine, based on the calculated density, the target data processing mode that matches the active vertex set in a predetermined push data processing mode and a predetermined pull data processing mode.

Specifically, contrast density is determined based on the first quantity stored in the external memory of the first distributed node, and whether the density of the active vertex set is not less than the contrast density is determined; and if the density of the active vertex set is not less than the contrast density, the pull data processing mode is determined as the target data processing mode; or if the density of the active vertex set is less than the contrast density, the push data processing mode is determined as the target data processing mode. The push data processing mode can also be referred to as a push mode, and the pull data processing mode can also be referred to as a pull mode.

That contrast density is determined based on the first quantity stored in the external memory of the first distributed node can include: calculating a proportion of the first quantity to a predetermined value, and determining a calculation result as the contrast density. The predetermined value can be set independently based on a scale of the target graph data in actual applications. For example, based on the target graph data shown in FIG. 1, if the predetermined value is 2, in the process of the first round of iteration, the calculated contrast density is 16/2=8. Because the calculated density 5 of the active vertex set is less than 8, it is determined that the target data processing mode is the push data processing mode. For another example, in a process of the second round of iteration, the calculated density 14 of the active vertex set is greater than 8, and therefore, it is determined that the target data processing mode is the pull data processing mode.

Figure 6:
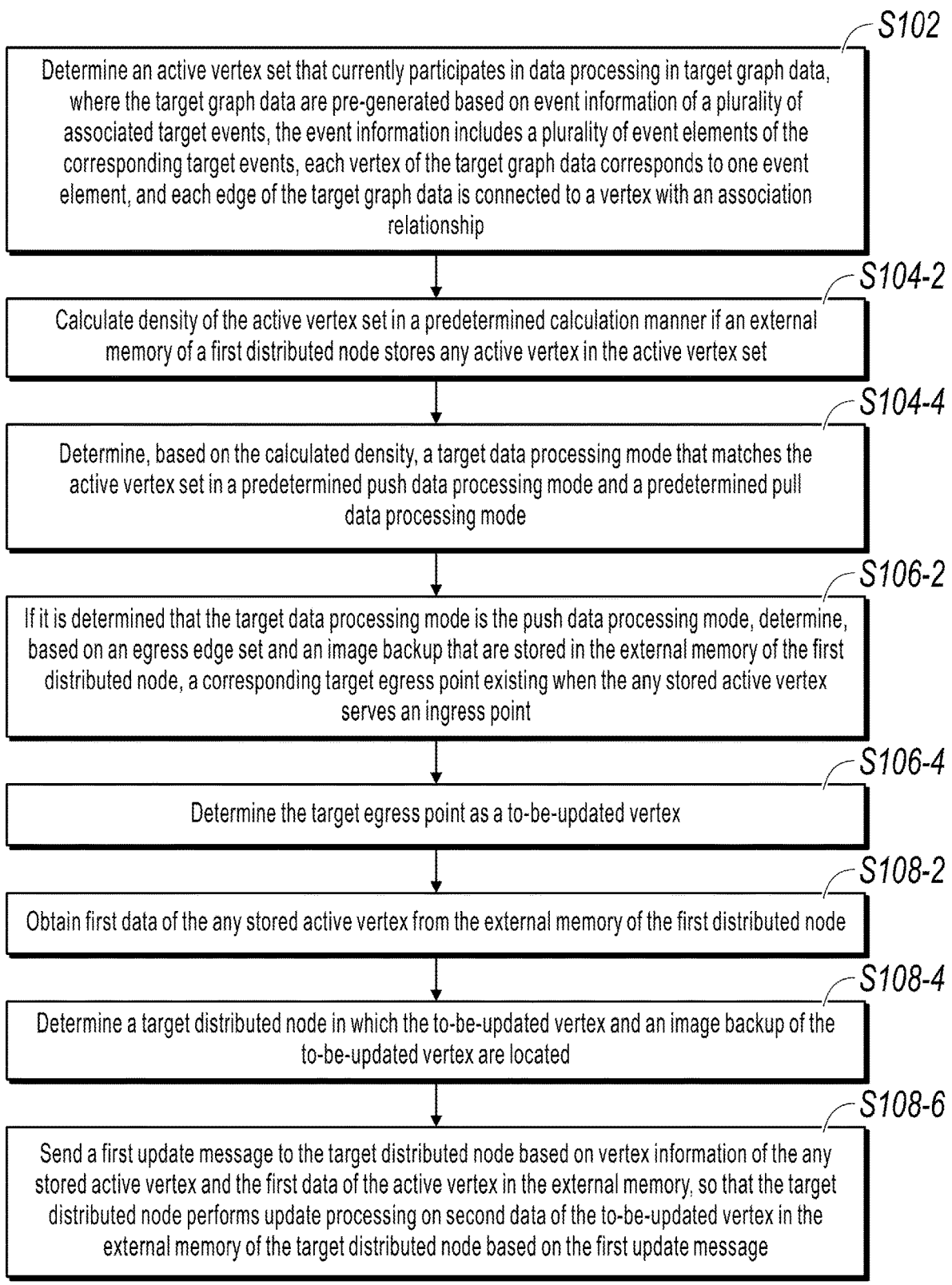
FIG. 6 is a third schematic flowchart illustrating a distributed data processing method, according to an embodiment of this specification.

The density of the active vertex set is calculated, and the target data processing mode is determined based on the density, to improve processing efficiency of the active vertex set. Further, as shown in FIG. 6, when the target data processing mode is the push data processing mode, step S106 can include step S106-2 and step S106-4. Step S106-2: If it is determined that the target data processing mode is the push data processing mode, determine, based on the egress edge set and the image backup that are stored in the external memory of the first distributed node, a corresponding target egress point existing when the any stored active vertex serves as the ingress point. Descriptions are provided by still using the example in which the graph data shown in FIG. 1 are the target graph data and the distributed system includes the distributed node 0 and the distributed node 1. In the process of the first round of iteration, the active vertex set is {0}. Because the vertex 0 is stored in the distributed node 0, in step S104, the distributed node 1 determines that an external memory of the distributed node 1 does not store any active vertex in the active vertex set, and does not perform any processing. In step S104, the distributed node 0 determines that an external memory of the distributed node 0 stores the active vertex in the active vertex set, and determines, based on the calculated density, that the target data processing mode is the push data processing mode. Therefore, in step S106-2, when it is determined, based on the egress edge set and the image backup that are stored in the external memory of the distributed node 0, that the vertex 0 is used as an ingress point, corresponding target egress points are the vertex 1, the vertex 2, the vertex 5, and the vertex 6.

Step S106-4: Determine the target egress point as the to-be-updated vertex. For example, the vertex 1, the vertex 2, the vertex 5, and the vertex 6 that are determined in step S106-2 are determined as to-be-updated vertexes.

Corresponding to step S106-2 and step S106-4, as shown in FIG. 6, step S108 can include step S108-2 to step S108-6. Step S108-2: Obtain the first data of the any active vertex from the external memory of the first distributed node. Step S108-4: Determine a target distributed node in which the to-be-updated vertex and an image backup of the to-be-updated vertex are located. Specifically, an association relationship between each vertex and a distributed node in which the vertex is located can be established in advance, and an association relationship between an image backup of each vertex and a distributed node in which the image backup is located can be established in advance. The established association relationships are stored in each distributed node, and the first distributed node determines, based on the association relationship, the target distributed node in which the to-be-updated vertex is located and the target distributed node in which the image backup of the to-be-updated vertex is located.

In the example of the first round of iteration, if the distributed node 0 determines, based on the stored association relationship, that the to-be-updated vertex 1 and the vertex 2 are in the distributed node 0, the to-be-updated vertex 5 and the vertex 6 are in the distributed node 1, an image backup of the vertex 2 is in the distributed node 1, and image backups of the to-be-updated vertex 5 and the to-be-updated vertex 6 are in the distributed node 0, the distributed node 0 and the distributed node 1 are determined as target distributed nodes.

Step S108-6: Send the first update message to the target distributed node based on vertex information of the any stored active vertex and the first data of the active vertex in the external memory, so that the target distributed node performs update processing on the second data of the to-be-updated vertex in the external memory of the target distributed node based on the first update message.

The vertex information can be a vertex identifier, or can be an event element corresponding to the vertex. Descriptions are provided by using an example in which the target event is a resource transfer. The active vertex can correspond to the resource transfer-out account. The vertex information of the active vertex can be the account information of the resource transfer-out account. The to-be-updated vertex can correspond to the resource transfer-in account. The first data can include data such as a quantity of resources transferred to each resource transfer-in account. It is worthwhile to note that, in the first round of iteration, the distributed node operated by the user can store the first data entered by the user in the primary backup of the active vertex in the external memory of the distributed node. In the example of the first round of iteration, the distributed node 0 sends the first update message to the distributed node 0 based on vertex information of the vertex 0, a quantity of resources transferred to the transfer-in account corresponding to the vertex 1, a quantity of resources transferred to the transfer-in account corresponding to the vertex 2, a quantity of resources transferred to the transfer-in account corresponding to the vertex 5, a quantity of resources transferred to the transfer-in account corresponding to the vertex 6, etc. The distributed node 0 sends the first update message to the distributed node 1 based on the vertex information of the vertex 0, a quantity of resources transferred to the transfer-in account corresponding to the vertex 2, a quantity of resources transferred to the transfer-in account corresponding to the vertex 5, a quantity of resources transferred to the transfer-in account corresponding to the vertex 6, etc.

Therefore, when it is determined that the target data processing mode is the push data processing mode, data update processing can be performed along the egress edge of the active vertex, to implement data update of the corresponding target egress point existing when the active vertex serves as an ingress point.

Figure 7:
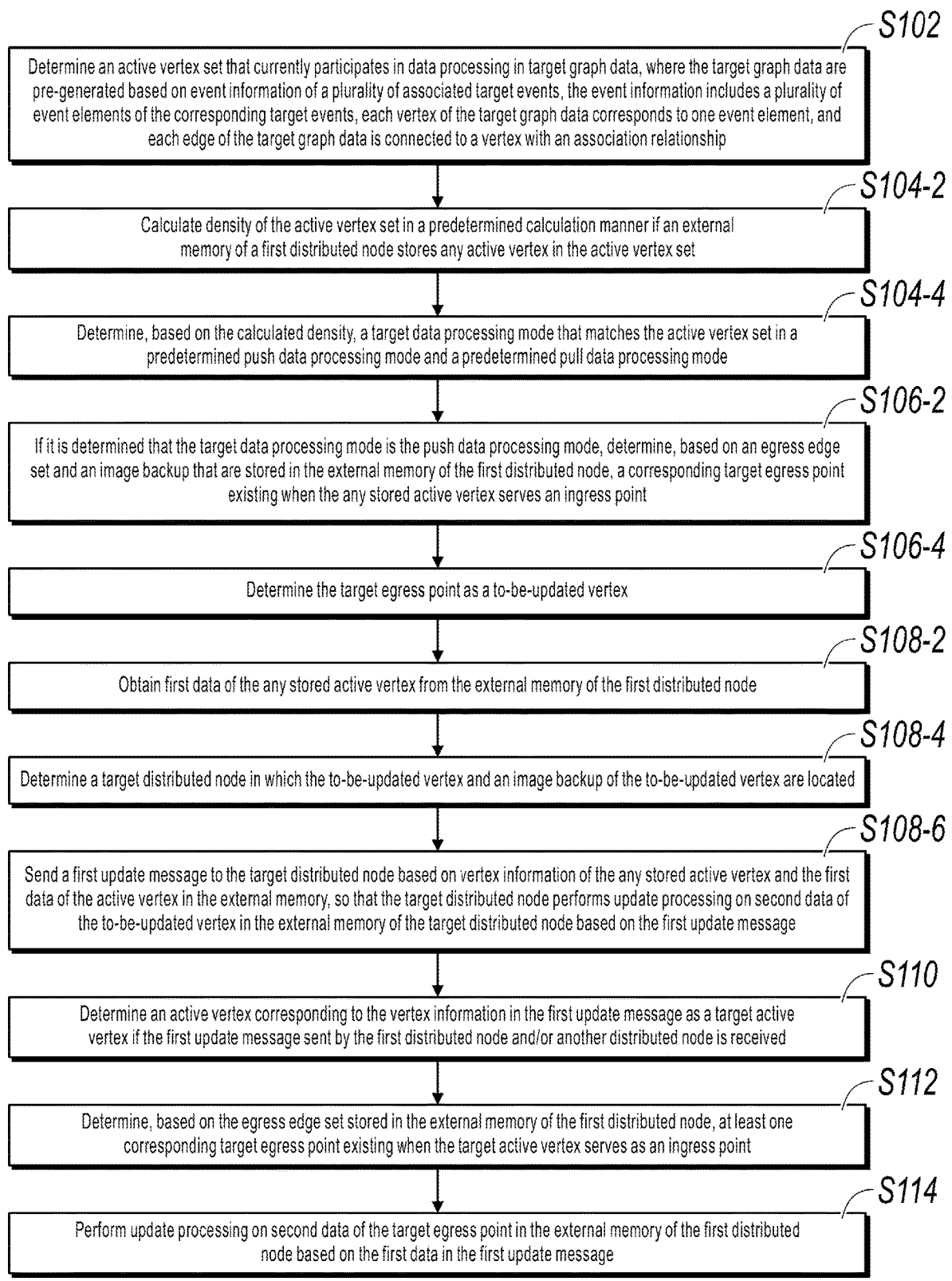
FIG. 7 is a fourth schematic flowchart illustrating a distributed data processing method, according to an embodiment of this specification.

Further, because the first distributed node may be the target distributed node, as shown in FIG. 7, the method can further include step S110 to step S114.

Step S110: Determine an active vertex corresponding to the vertex information in the first update message as a target active vertex if the first update message sent by the first distributed node and/or another distributed node is received. In different iteration processes, active vertexes may be stored in a plurality of distributed nodes in a distributed manner Therefore, the first distributed node may receive only the first update message sent by the first distributed node, may receive only the first update message sent by the another distributed node, or may receive both the first update message sent by the first distributed node and the first update message sent by the another distributed node.

Step S112: Determine, based on the egress edge set stored in the external memory of the first distributed node, at least one corresponding target egress point existing when the target active vertex serves as the ingress point. Step S114: Perform update processing on second data of the target egress point in the external memory of the first distributed node based on the first data in the first update message.

The determined target egress point is the to-be-updated vertex. In the example of the first round of iteration, the distributed node 0 determines, based on the received first update message, that the vertex 0 is the target active vertex; determines, based on the egress edge set stored in the external memory of the distributed node 0, that the determined target egress point is the vertex 1 and the vertex 2; and performs update processing on second data of the vertex 1 and the vertex 2 in the external memory of the distributed node 0 based on the corresponding first data in the first update message. For example, resource transfer data are added to the second data of the vertex 1 and the vertex 2, and a total quantity of resources in resource accounts corresponding to the vertex 1 and the vertex 2 is updated. The distributed node 1 determines, based on the received first update message, that the vertex 0 is the target active vertex; determines, based on the egress edge set stored in the external memory of the distributed node 1, that the target egress point is the vertex 5 and the vertex 6; and performs update processing on second data of the vertex 5 and the vertex 6 in the external memory of the distributed node 1 based on the corresponding first data in the first update message, for example, separately adds resource transfer data to the second data of the vertex 5 and the vertex 6.

In the push data processing mode, when receiving the first update message, the distributed node performs update processing only on the second data that are of the target egress point (that is, the to-be-updated vertex) and that are determined based on the egress edge set of the distributed node, and does not need to perform update processing on an image backup corresponding to the first update message (for example, the distributed node 0 does not need to perform update processing on image backups of the node 5 and the node 6 in the external memory of the distributed node 0). Therefore, memory use and synchronization time are reduced, and related data of the to-be-updated vertex corresponding to the image backup in the first update message can be used in real time without being persisted, thereby reducing huge IO overheads of the external memory.

Further, for the same distributed node, update processing may be simultaneously performed on second data of a plurality of to-be-updated vertexes. To eliminate synchronization overheads introduced by the push data processing mode and improve update efficiency, in an embodiment of this specification, a corresponding thread is allocated to each vertex in advance, and second data of a corresponding vertex are updated based on the thread. That is, step S114 can include step S114-2 and step S114-4.

Step S114-2: Determine a target thread corresponding to each target egress point.

Specifically, a correspondence between vertex information of each vertex and thread information is established in advance, and the correspondence is stored in an external memory of a corresponding distributed node. The distributed node determines the target thread corresponding to each target egress point based on the correspondence.

Step S114-4: Send the first update message to the corresponding target thread, so that the target thread performs update processing on the second data of the corresponding target egress point in the external memory of the first distributed node based on the first data in the first update message.

In consideration that a plurality of active vertexes may simultaneously update the same target egress point, to avoid data contention, in an embodiment of this specification, step S114-4 can include: determining whether the second data of the target egress point are in a locked state; and storing the first update message in a message queue of the corresponding target egress point if the second data of the target egress point are in the locked state, so that the target thread corresponding to the target egress point obtains the first update message from the corresponding message queue after performing unlocking processing on the second data, and performs update processing on the second data based on the first data in the first update message after performing locking processing on the second data; or sending the first update message to the corresponding target thread if the second data of the target egress point are not in the locked state, so that after performing locking processing on the second data of the target egress point, the target thread performs updating processing on the second data of the target egress point based on the first data in the first update message, and performs unlocking processing on the second data after updating is completed.

That is, in the data pushing processing mode, for each thread, when updating processing is performed on the corresponding second data, locking processing is first performed on the second data, so that the second data are in the locked state. After locking processing, the second data are updated, and after updating is completed, unlocking processing is performed on the second data, so that the second data are in an unlocked state. A next time of update processing can be performed only when the second data are in the unlocked state. Therefore, the second data are locked and unlocked, to avoid data contention existing when a plurality of active vertexes simultaneously update second data of the same target egress point.

Figure 8:
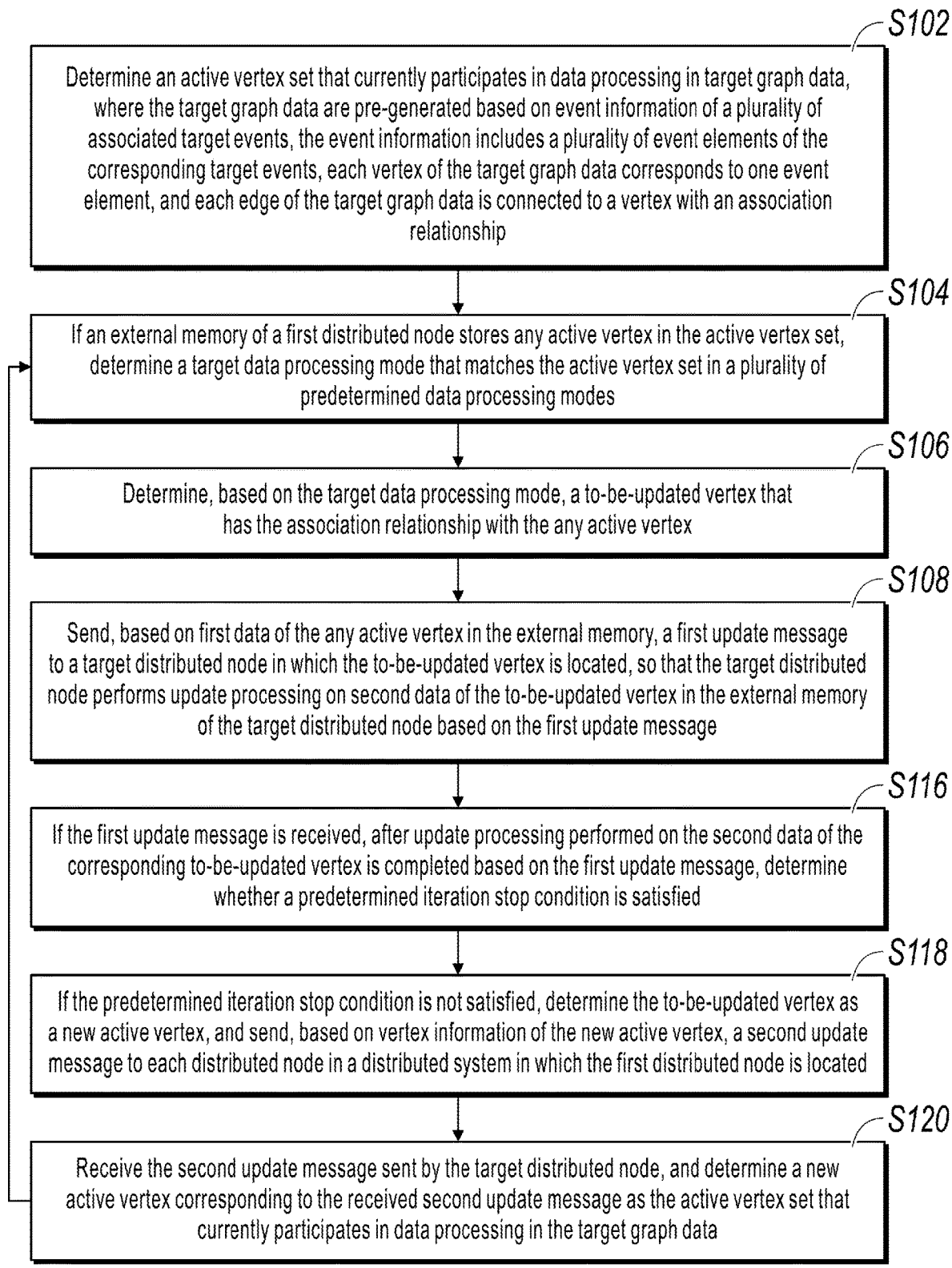
FIG. 8 is a fifth schematic flowchart illustrating a distributed data processing method, according to an embodiment of this specification.

After the second data corresponding to the to-be-updated vertex are updated, another vertex that has an association relationship with the to-be-updated vertex may be updated accordingly. To implement effective update of each data, in an embodiment of this specification, as shown in FIG. 8, after step S108, step S116 to step S120 can be further included.

Step S116: If the first update message is received, after update processing performed on the second data of the corresponding to-be-updated vertex is completed based on the first update message, determine whether a predetermined iteration stop condition is satisfied.

When the target data processing mode is the push data processing mode, for a process of performing update processing based on the first update message, references can be made to an implementation process of step S110 to step S114. When the target data processing mode is the pull data processing mode, for a process of performing update processing based on the first update message, references can be made to the following related descriptions. Details are not repeatedly described here.

The predetermined iteration stop condition can be set independently based on a need in actual applications. For example, when a quantity of iteration times reaches a predetermined threshold of the quantity of iteration times, it is determined that the predetermined iteration stop condition is satisfied. For another example, when it is determined that the active vertex set is empty, it is determined that the predetermined iteration stop condition is satisfied. For another example, a condition of the predetermined threshold of the quantity of iteration times and a condition that the active vertex set is empty are predetermined. When one of the two conditions are satisfied, it is determined that the predetermined iteration stop condition is satisfied.

Step S118: If the predetermined iteration stop condition is not satisfied, determine the to-be-updated vertex as a new active vertex, and send, based on vertex information of the new active vertex, a second update message to each distributed node in a distributed system in which the first distributed node is located.

Step S120: Receive the second update message sent by the target distributed node, and determine the new active vertex corresponding to the received second update message as the active vertex set that currently participates in data processing in the target graph data. Return to step S104.

It can be understood that, when the target distributed node determined by the first distributed node includes only the first distributed node, the first distributed node receives the second update message sent by the first distributed node. When the target distributed node determined by the first distributed node includes the first distributed node and another distributed node in the distributed system, the first distributed node receives the second update message sent by the first distributed node and the another distributed node. When the target distributed node determined by the first distributed node includes only another distributed node in the distributed system, the first distributed node receives the second update message sent by the another distributed node.

In the example of the first round of iteration, after performing update processing on the second data of the vertex 1 and the vertex 2, the distributed node 0 determines that the vertex 1 and the vertex 2 are new active vertexes, and sends, based on vertex information of the vertex 1 and the vertex 2, the second update message to each distributed node in the distributed system in which the distributed node 0 is located. After performing update processing on second data of the vertex 5 and the vertex 6, the distributed node 1 determines that the vertex 5 and the vertex 6 are new active vertexes, and sends, based on vertex information of the vertex 5 and the vertex 6, the second update message to each distributed node in the distributed system in which the distributed node 1 is located. Both the distributed node 0 and the distributed node 1 determine, based on each received second update message, that a vertex set including the vertex 1, the vertex 2, the vertex 5, and the vertex 6 is the active vertex set that currently participates in data processing in the target graph data. That is, the active vertex set in the process of the second round of iteration is {1, 2, 5, 6}.

Therefore, the second update message is sent, so that each distributed node in the distributed system can determine, during a next round of iteration processing, the active vertex set that currently participates in data processing in the target graph data, to perform subsequent processing.

Figure 9:
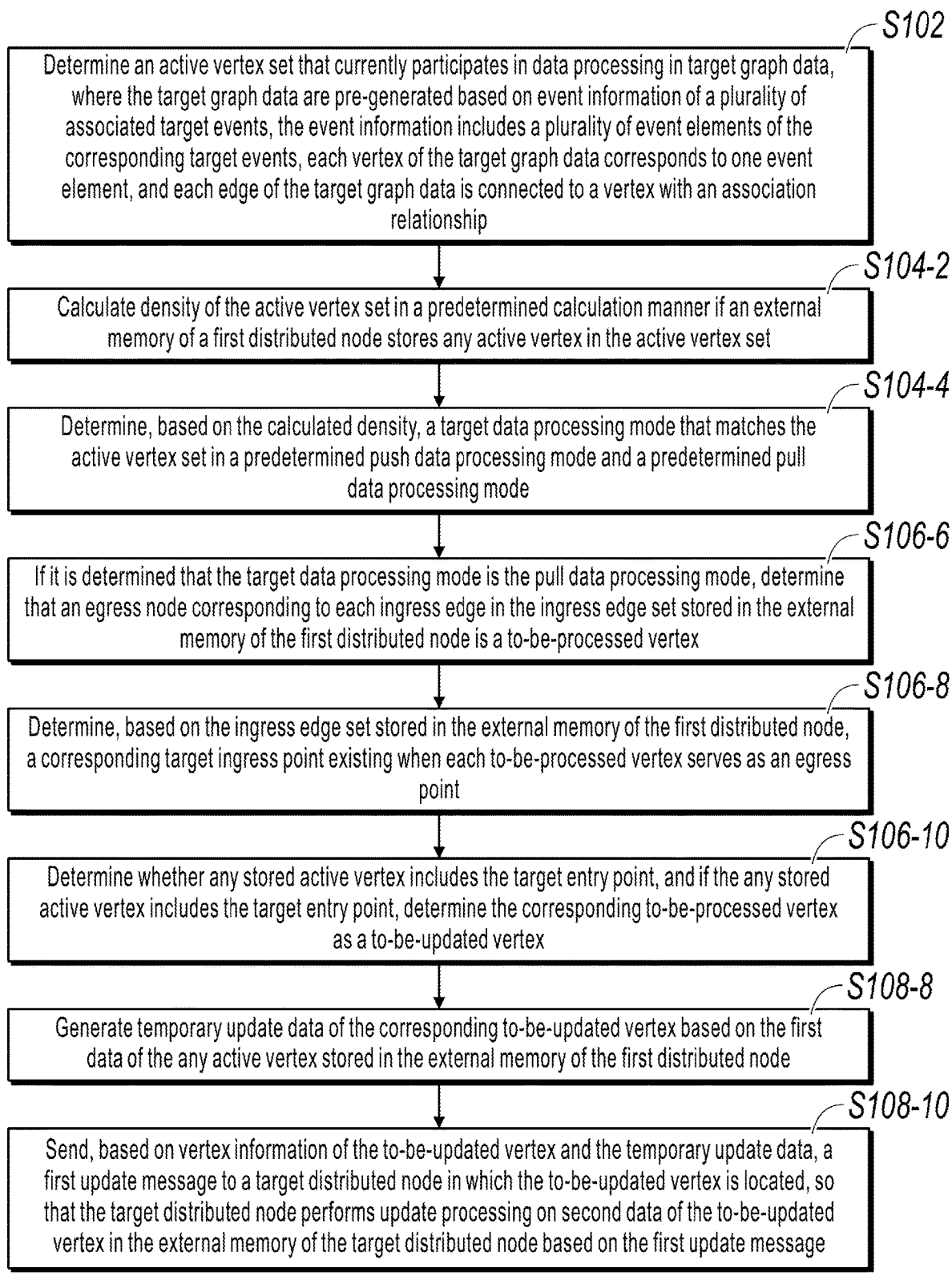
FIG. 9 is a sixth schematic flowchart illustrating a distributed data processing method, according to an embodiment of this specification.

Further, when the target data processing mode is the pull data processing mode, as shown in FIG. 9, step S106 can include steps S106-6 to S106-10. Step S106-6: If the target data processing mode is the pull data processing mode, determine that an egress point that correspond to each ingress edge and that is in the ingress edge set stored in the external memory of the first distributed node is a to-be-processed vertex. Step S106-8: Determine, based on the ingress edge set stored in the external memory of the first distributed node, a corresponding target ingress point existing when each to-be-processed vertex serves as an egress point. Step S106-10: Determine whether the any active vertex includes the target ingress point; and determine the corresponding to-be-processed vertex as a to-be-updated vertex if the any active vertex includes the target ingress point.

In the above-mentioned example, after the first round of iteration processing ends, the distributed node 0 determines that the active vertex set of the second round of iteration processing is {1, 2, 5, 6}. If the distributed node 0 determines that the external memory of the distributed node 0 stores the active vertex 1 and the active vertex 2, the distributed node 0 calculates the density of the active vertex set, and determines, based on the density, that the target data processing mode is the pull data processing mode. The distributed node 0 determines, based on an ingress edge set stored in the external memory of the distributed node 0, that the vertex 1 to a vertex 7 and a vertex 9 are to-be-processed vertexes. The distributed node 0 determines, based on the ingress edge set stored in the external memory of the distributed node 0, that a corresponding target ingress point existing when the vertex 1 serves as an egress point is the vertex 0. Because active vertexes currently stored in the distributed node 0 are the vertex 1 and the vertex 2, and do not include the vertex 0, it is determined that the vertex 1 is not a to-be-updated vertex. Similarly, the distributed node 0 determines that a corresponding target ingress point existing when the vertex 2 serves as an egress point is the vertex 0. Because an active vertex currently stored in the distributed node 0 does not include the vertex 0, it is determined that the vertex 2 is not a to-be-updated vertex. The distributed node 0 determines that corresponding target ingress points existing when the vertex 3 serves as an egress point are the vertex 1 and the vertex 2. Because active vertexes currently stored in the distributed node 0 are the vertex 1 and the vertex 2, it is determined that the vertex 3 is a to-be-updated vertex. The distributed node 0 determines that corresponding target ingress points existing when the vertex 4 serves as an egress point are the vertex 1 and the vertex 2. Because active vertexes currently stored in the distributed node 0 are the vertex 1 and the vertex 2, it is determined that the vertex 4 is a to-be-updated vertex. The distributed node 0 determines that a corresponding target ingress point existing when the vertex 5 serves as an egress point is the vertex 0. Because an active vertex currently stored in the distributed node 0 does not include the vertex 0, it is determined that the vertex 5 is not a to-be-updated vertex. The distributed node 0 determines that a corresponding target ingress point existing when the vertex 6 serves as the egress point is the vertex 0. Because an active vertex currently stored in the distributed node 0 does not include the vertex 0, it is determined that the vertex 6 is not a to-be-updated vertex. The distributed node 0 determines that a corresponding target ingress point existing when the vertex 7 serves as an egress point is the vertex 2. Because an active vertex currently stored in the distributed node 0 includes the vertex 2, it is determined that the vertex 7 is a to-be-updated vertex. The distributed node 0 determines that a corresponding target ingress point existing when the vertex 9 serves as an egress point is the vertex 4. Because an active vertex currently stored in the distributed node 0 does not include the vertex 4, it is determined that the vertex 9 is not a to-be-updated vertex.

After the first round of iteration processing ends, the distributed node 1 determines that the active vertex set of the second round of iteration processing is {1, 2, 5, 6}. If the distributed node 1 determines that the external memory of the distributed node 1 stores the active vertex 5 and the active vertex 6, the distributed node 1 calculates the density of the active vertex set, and determines, based on the density, that the target data processing mode is the pull data processing mode. The distributed node 1 determines, based on an ingress edge set stored in the external memory of the distributed node 1, that the vertex 4 and the vertex 7 to the vertex 9 are to-be-processed vertexes. The distributed node 1 determines, based on the ingress edge set stored in the external memory of the distributed node 1, that a corresponding target ingress point existing when the vertex 4 serves as an egress point is the vertex 5. Because active vertexes currently stored in the distributed node 1 are the vertex 5 and the vertex 6, and include the vertex 5, it is determined that the vertex 4 is a to-be-updated vertex. Similarly, the distributed node 1 determines that corresponding target ingress points existing when the vertex 7 serves as an egress point are the vertex 5 and the vertex 6. Because active vertexes currently stored in the distributed node 1 are the vertex 5 and the vertex 6, it is determined that the vertex 7 is a to-be-updated vertex. The distributed node 1 determines that corresponding target ingress points existing when the vertex 8 serves as an egress point are the vertex 5 and the vertex 6. Because active vertexes currently stored in the distributed node 1 are the vertex 5 and the vertex 6, it is determined that the vertex 8 is a to-be-updated vertex. The distributed node 1 determines that a corresponding target ingress point existing when the vertex 9 serves as an egress point is the vertex 7. Because an active vertex currently stored in the distributed node 1 does not include the vertex 7, it is determined that the vertex 9 is not a to-be-updated vertex.

Corresponding to step S106-6 to step S106-10, as shown in FIG. 9, step S108 includes step S108-8 and step S108-10. Step S108-8: Generate temporary update data of the corresponding to-be-updated vertex based on the first data of the any active vertex in the external memory of the first distributed node. Step S108-10: Send, based on vertex information of the to-be-updated vertex and the temporary update data, the first update message to the target distributed node in which the to-be-updated vertex is located, so that the target distributed node performs update processing on the second data of the to-be-updated vertex in the external memory of the target distributed node based on the first update message.

In the above-mentioned example, the distributed node 0 generates temporary update data of the vertex 3 based on first data that is of the active vertex 1 and the active vertex 2 and that is stored in the external memory of the distributed node 0; generates the vertex 4 based on the first data that is of the active vertex 1 and the active vertex 2 and that is stored in the external memory of the distributed node 0; generates temporary update data of the vertex 7 based on first data that is of the active vertex 2 and that is stored in the external memory of the distributed node 0; sends, based on vertex information of the vertex 3, vertex information of the vertex 4, the generated temporary update data of the vertex 3, and the generated temporary update data of the vertex 4, the first update message to the distributed node 0 in which the vertex 3 and the vertex 4 are located; and sends, based on vertex information of the vertex 7 and the generated temporary update data of the vertex 7, the first update message to the distributed node 1 in which the vertex 7 is located.

The distributed node 1 generates the temporary update data of the vertex 4 based on the first data that are of the active vertex 5 and that are stored in the external memory of the distributed node 1; separately generates temporary update data of the vertex 7 and temporary update data of the vertex 8 based on the first data that are of the active vertex 5 and the active vertex 6 and that are stored in the external memory of the distributed node 1; sends, based on the vertex information of the vertex 4 and the generated temporary update data of the vertex 4, the first update message to the distributed node 0 in which the vertex 4 is located; and sends, based on the vertex information of the vertex 7 and the vertex 8 and the generated temporary update data of the vertex 7 and the vertex 8, the first update message to the distributed node 1 in which the vertex 7 and the vertex 8 are located.

Therefore, when it is determined that the target data processing mode is the pull data processing model, the to-be-updated vertex and the temporary update data of the to-be-updated vertex are determined based on the ingress edge set, and the temporary update data are sent to the target distributed node in which the to-be-updated vertex is located, thereby implementing data update of the to-be-updated vertex.

Figure 10:
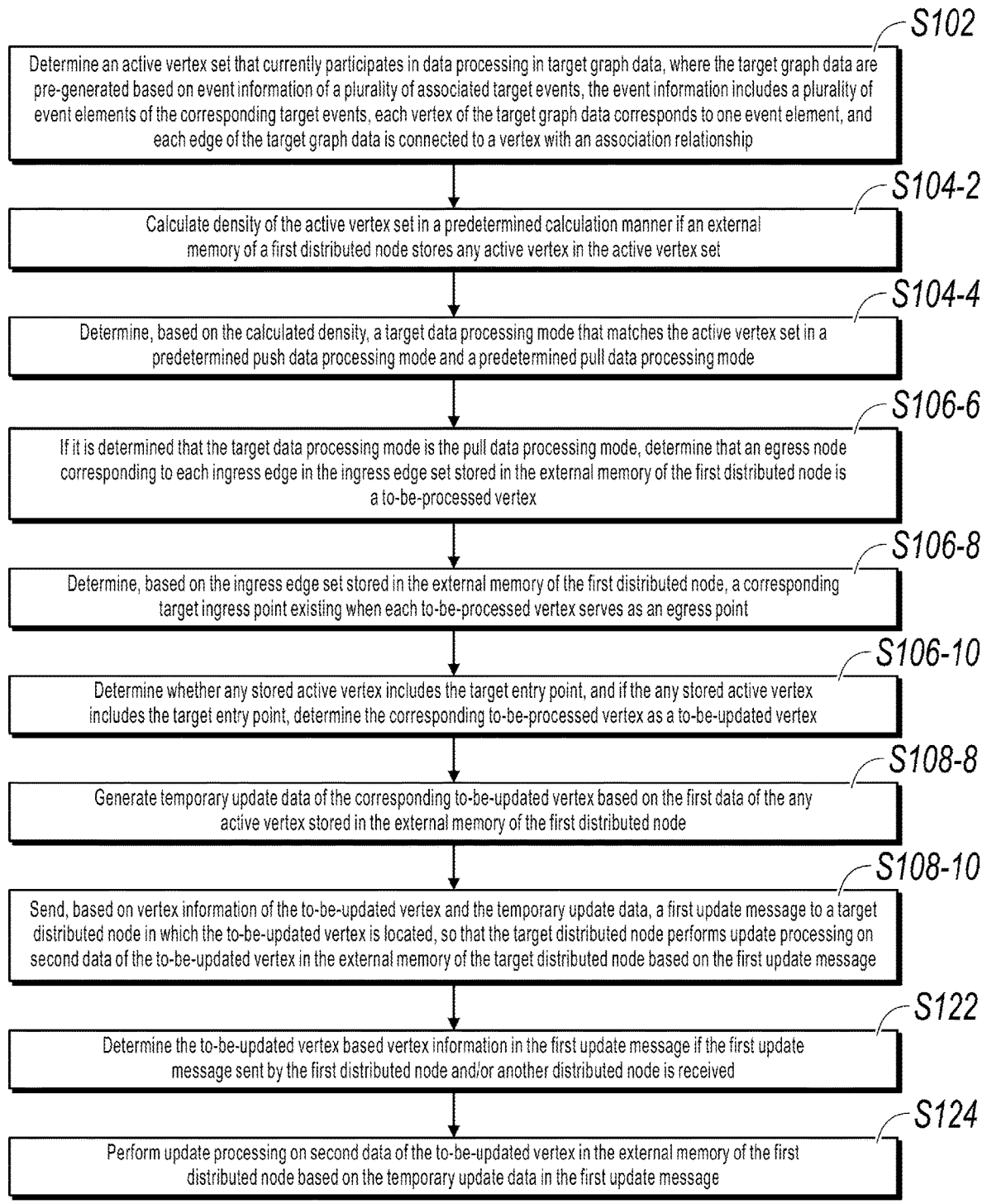
FIG. 10 is a seventh schematic flowchart illustrating a distributed data processing method, according to an embodiment of this specification.

Further, because the first distributed node may be the target distributed node in which the to-be-updated vertex is located, as shown in FIG. 10, after step S108-10, step S122 and step S124 can be further included. Step S122: Determine the to-be-updated vertex based on vertex information in the first update message if the first update message sent by the first distributed node and/or another distributed node is received. Step S124: Perform update processing on the second data of the to-be-updated vertex in the external memory of the first distributed node based on the temporary update data in the first update message.

In the above-mentioned example, when the distributed node 0 receives the first update message sent by the distributed node 0, the distributed node 0 determines that to-be-updated vertexes are the vertex 3 and the vertex 4; updates second data of the vertex 3 in the external memory of the distributed node 0 based on the temporary update data in the first update message; updates second data of the vertex 4 in the external memory of the distributed node 0, for example, stores, in the second data that are of the vertex 3, resource transfer data of a resource transfer account corresponding to the vertex 3 and that are included in the temporary update data; updates a total quantity of resources in a resource account corresponding to the vertex 3; stores, in the second data of the vertex 4, resource transfer data that are of a resource transfer account corresponding to the vertex 4 and that are included in the temporary update data; updates a total quantity of resources in a resource account corresponding to the vertex 4; etc. When receiving the first update message sent by the distributed node 1, the distributed node 0 determines that the to-be-updated vertex is the vertex 4, and continues to update the second data of the vertex 4 in the external memory of the distributed node 0 based on the temporary update data in the first update message. Similarly, the distributed node 1 determines, based on each received first update message, that to-be-updated vertexes are the vertex 7 and the vertex 8, and updates second data of the vertex 7 and the vertex 8 in the external memory of the distributed node 1 based on the temporary update data in the first update message.

To complete updating processing of all to-be-updated data, after step S124, step S116 to step S120 can still be performed, so that the active vertex set that participates in data processing in the target graph data is determined when the third round of iteration processing is performed. In the above-mentioned example, the distributed node 0 determines that the vertex 3 and the vertex 4 are new active vertexes, and sends the second update message to each distributed node in the distributed system based on vertex information of the vertex 3 and the vertex 4. The distributed node 1 determines that the vertex 7 and the vertex 8 are new active vertexes, and sends the second update message to each distributed node in the distributed system based on vertex information of the vertex 3 and the vertex 4. Each distributed node determines, based on each received second update message, that an active vertex set that currently participates in data processing is {3, 4, 7, 8}.

Figure 11:
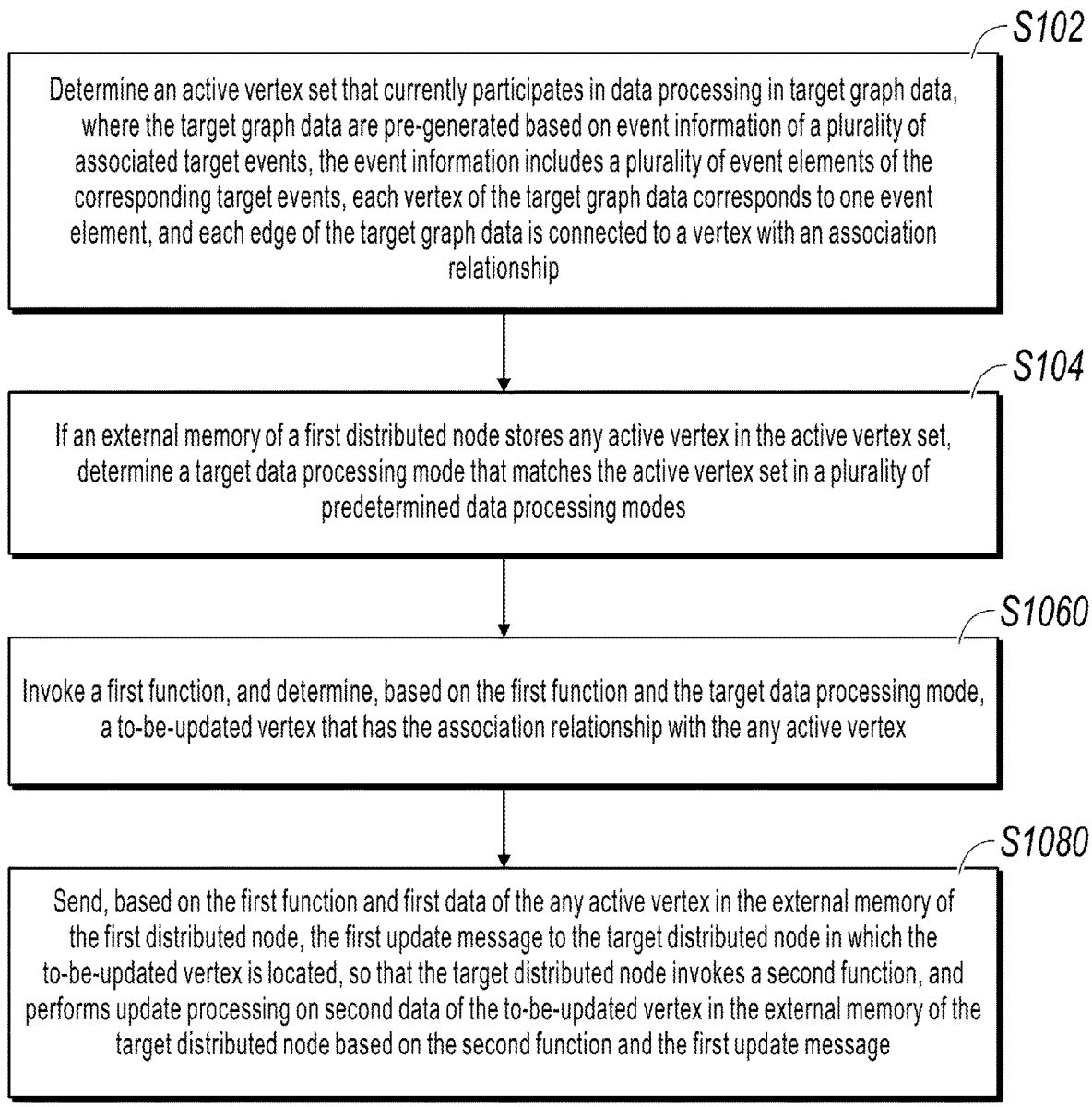
FIG. 11 is an eighth schematic flowchart illustrating a distributed data processing method, according to an embodiment of this specification.

To better implement the above-mentioned data processing process, in an embodiment of this specification, a first function and a second function are predetermined, and determining of the to-be-updated vertex and updating processing of the second data are performed based on the first function and the second function. Specifically, as shown in FIG. 11, step S106 can include step S1060. Step S108 can include step S1080. Step S1060: Invoke a first function, and determine, based on the first function and the target data processing mode, the to-be-updated vertex that has the association relationship with the any active vertex. Step S1080: Send, based on the first function and the first data of the any active vertex in the external memory, the first update message to the target distributed node in which the to-be-updated vertex is located, so that the target distributed node invokes the second function, and performs update processing on the second data of the to-be-updated vertex in the external memory of the target distributed node based on the second function and the first update message.

The first function can also be referred to as a signal function, and the second function can also be referred to as a slot function.

It is worthwhile to note that, when the target distributed node determined by the first distributed node includes the first distributed node, the target distributed node sends the first update message and the second update message to the first distributed node. In actual applications, the first distributed node possibly does not send data to the first distributed node.

In an embodiment of this specification, the active vertex set that currently participates in data processing in the target graph data is determined; if the external memory of the first distributed node stores the any active vertex in the active vertex set, the target data processing mode that matches the active vertex set in the plurality of predetermined data processing modes is determined; the to-be-updated vertex that has the association relationship with the any active vertex is determined based on the target data processing mode; and the first update message is sent, based on the first data of the any active vertex in the external memory, to the target distributed node in which the to-be-updated vertex is located, so that the target distributed node performs update processing on the second data of the to-be-updated vertex in the external memory of the target distributed node based on the first update message. Therefore, the target graph data are generated based on the event information of the plurality of associated target events, and data processing is performed based on the target graph data, to not only implement effective association of data in big data and centralized processing of associated data and avoid data omission, but also improve data processing efficiency. A distributed data processing system is used, and related data of the target graph data are stored in an external memory of each distributed node, to not only implement effective expansion of a memory, but also satisfy big data processing need and ensure data processing efficiency, because the distributed node can perform data processing in parallel. In addition, the distributed data processing system supports a plurality of data processing modes, and a target data processing mode that matches a current active vertex set is determined, to not only improve data processing performance of the distributed data processing system, but also further improve data processing efficiency.

Figure 12:
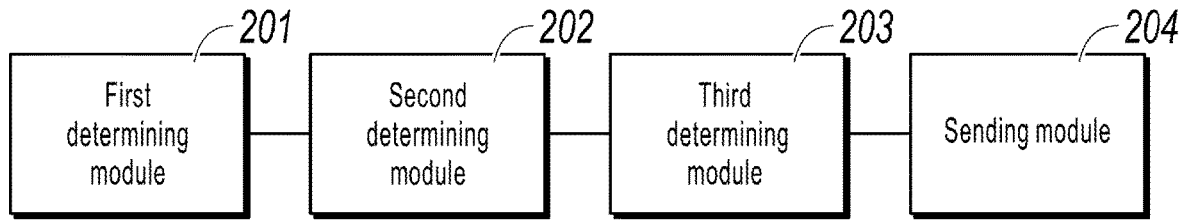
FIG. 12 is a schematic diagram illustrating a module composition of a distributed data processing apparatus, according to an embodiment of this specification.

Corresponding to the described distributed data processing method, based on a same technical concept, an embodiment of this specification further provides a distributed data processing apparatus. FIG. 12 is a schematic diagram illustrating a module composition of a distributed data processing apparatus, according to an embodiment of this specification. As shown in FIG. 12, the apparatus includes: a first determining module 201, configured to determine an active vertex set that currently participates in data processing in target graph data, where the target graph data are pre-generated based on event information of a plurality of associated target events, the event information includes a plurality of event elements of the corresponding target events, each vertex of the target graph data corresponds to one of the event elements, and each edge of the target graph data is connected to the vertex with an association relationship; a second determining module 202, configured to: if an external memory of a first distributed node stores any active vertex in the active vertex set, determine a target data processing mode that matches the active vertex set in a plurality of predetermined data processing modes; a third determining module 203, configured to determine, based on the target data processing mode, a to-be-updated vertex that has the association relationship with the any active vertex; and a sending module 204, configured to send, based on first data of the any active vertex in the external memory, a first update message to a target distributed node in which the to-be-updated vertex is located, so that the target distributed node performs update processing on second data of the to-be-updated vertex in the external memory of the target distributed node based on the first update message.

Optionally, the apparatus further includes: a receiving module, where the receiving module is configured to: receive shard data and attribute information of the target graph data that are sent by a specified device, where the shard data are obtained by the specified device by performing division processing on the target graph data in a predetermined data division manner; and store the shard data and the attribute information in the external memory of the first distributed node; or the apparatus further includes: a division module, where the division module is configured to: if it is determined that the first distributed node has preprocessing permission, perform division processing on the target graph data in the predetermined data division manner, to obtain shard data to be allocated to each distributed node in a distributed system in which the first distributed node is located; and send the shard data and the attribute information of the target graph data to each distributed node in the distributed system, so that the distributed node stores the shard data and the attribute information in the external memory.

Optionally, the vertex includes an ingress point and an egress point, each edge in the target graph data is determined as a directed edge, the directed edge points from the ingress point to the egress point, the directed edge is an egress edge of the ingress point, and the directed edge is an ingress edge of the egress point; the shard data include a vertex subset, an ingress edge set corresponding to an ingress edge of each vertex in the vertex subset, an egress edge set corresponding to an egress edge of each vertex in the vertex subset, a primary backup of each vertex in the vertex subset, and an image backup of a vertex that forms the directed edge with each vertex in the vertex subset, the primary backup includes element data of an event element corresponding to a corresponding vertex, and the image backup is used to transfer a message; and the attribute information includes a first quantity of edges of the target graph data and a second quantity of egress edges of each vertex in the target graph data.

Optionally, the third determining module 203 is configured to: if it is determined that the target data processing mode is a push data processing mode, determine, based on the egress edge set and the image backup that are stored in the external memory of the first distributed node, a corresponding target egress point existing when the any active vertex serves as the ingress point; and determine the target egress point as the to-be-updated vertex; and correspondingly, the sending module 204 is configured to: obtain the first data of the any active vertex from the external memory of the first distributed node; determine a target distributed node in which the to-be-updated vertex and an image backup of the to-be-updated vertex are located; and send the first update message to the target distributed node based on vertex information of the any active vertex and the first data.

Optionally, the apparatus further includes: a first updating module, where the first updating module is configured to determine an active vertex corresponding to the vertex information in the first update message as a target active vertex if the first update message sent by the first distributed node and/or another distributed node is received; determine, based on the egress edge set stored in the external memory of the first distributed node, at least one corresponding target egress point existing when the target active vertex serves as the ingress point; and perform update processing on second data of the target egress point in the external memory of the first distributed node based on the first data in the first update message.

Optionally, the third determining module 203 is configured to: if the target data processing mode is a pull data processing mode, determine a to-be-processed vertex from an egress node and an ingress node that correspond to each ingress edge in the ingress edge set stored in the external memory of the first distributed node; determine, based on the ingress edge set stored in the external memory of the first distributed node, a corresponding target ingress point existing when each to-be-processed vertex serves as an egress point; determine whether the any active vertex includes the target ingress point; and determine the corresponding to-be-processed vertex as a to-be-updated vertex if the any active vertex includes the target ingress point.

Correspondingly, the sending module 204 is configured to: generate temporary update data of the corresponding to-be-updated vertex based on the first data of the any active vertex in the external memory of the first distributed node; and send, based on vertex information of the to-be-updated vertex and the temporary update data, the first update message to the target distributed node in which the to-be-updated vertex is located.

Optionally, the apparatus further includes a second updating module, where the updating module is configured to: determine the to-be-updated vertex based on vertex information in the first update message if the first update message sent by the first distributed node and/or another distributed node is received; and perform update processing on the second data of the to-be-updated vertex in the external memory of the first distributed node based on the temporary update data in the first update message.

The distributed data processing apparatus provided in an embodiment of this specification determines the active vertex set that currently participates in data processing in the target graph data; if the external memory of the first distributed node stores the any active vertex in the active vertex set, determines the target data processing mode that matches the active vertex set in the plurality of predetermined data processing modes; determines, based on the target data processing mode, the to-be-updated vertex that has the association relationship with the any active vertex; and sends, based on the first data of the any active vertex in the external memory, the first update message to the target distributed node in which the to-be-updated vertex is located, so that the target distributed node performs update processing on the second data of the to-be-updated vertex in the external memory of the target distributed node based on the first update message. Therefore, the target graph data are generated based on the event information of the plurality of associated target events, and data processing is performed based on the target graph data, to not only implement effective association of data in big data and centralized processing of associated data and avoid data omission, but also improve data processing efficiency. A distributed data processing system is used, and related data of the target graph data are stored in an external memory of each distributed node, to not only implement effective expansion of a memory, but also satisfy big data processing need and ensure data processing efficiency, because the distributed node can perform data processing in parallel. In addition, the distributed data processing system supports a plurality of data processing modes, and a target data processing mode that matches a current active vertex set is determined, to not only improve data processing performance of the distributed data processing system, but also further improve data processing efficiency.

It is worthwhile to note that the embodiments of the distributed data processing apparatus in this specification and the embodiments of the distributed data processing method in this specification are based on the same invention concept. Therefore, for specific implementation of the embodiments, references can be made to the implementation of the distributed data processing method, and details are not repeatedly described here.

Figure 13:
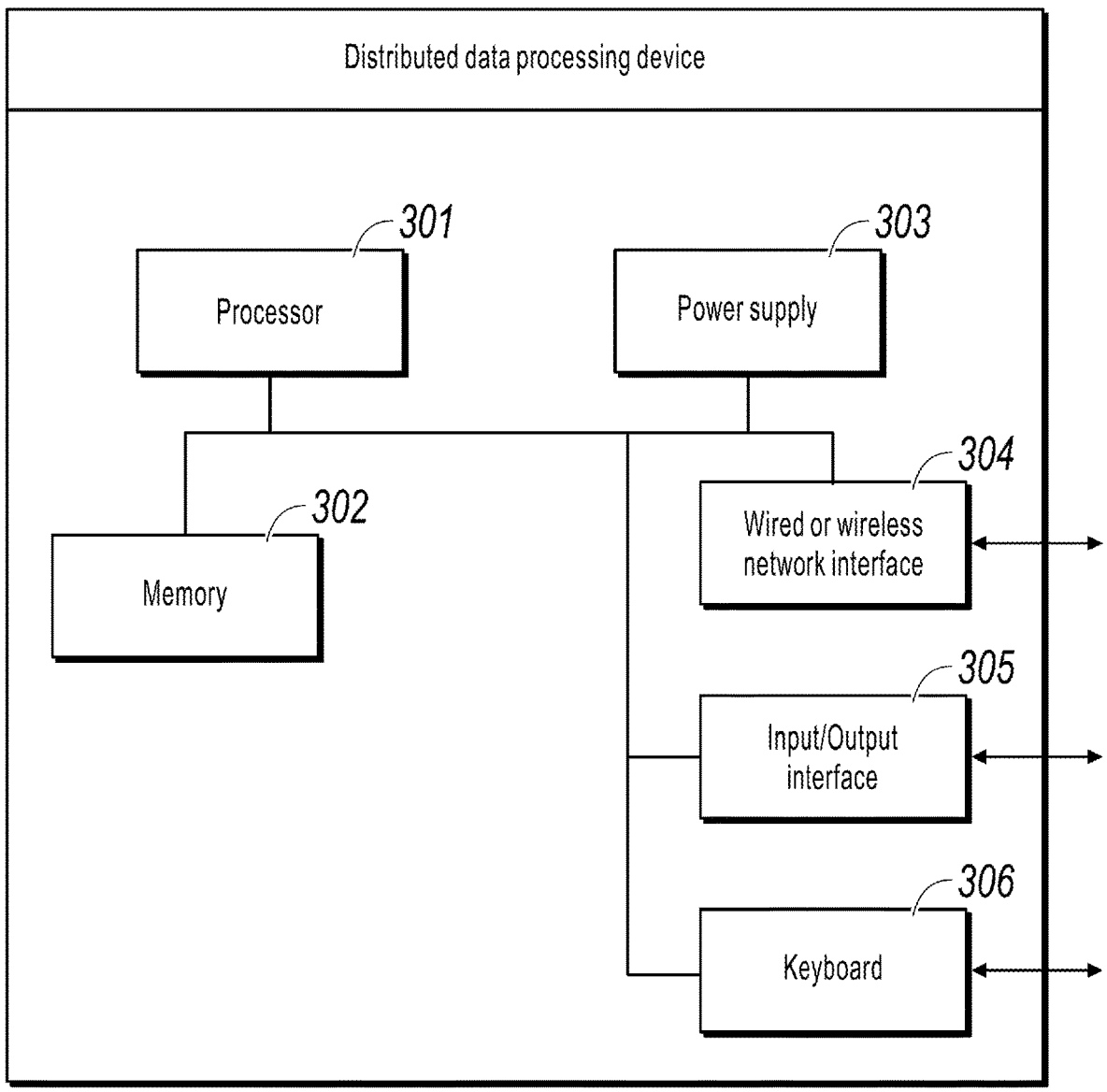
FIG. 13 is a schematic structural diagram illustrating a distributed data processing device, according to an embodiment of this specification.

Further, corresponding to the distributed data processing method, based on the same technical concept, an embodiment of this specification further provides a distributed data processing device. The device is configured to perform the distributed data processing method. FIG. 13 is a schematic structural diagram illustrating a distributed data processing device, according to an embodiment of this specification.

As shown in FIG. 13, the distributed data processing device can differ greatly because of a difference in configuration or performance, and can include one or more processors 301 and one or more memories 302. The memory 302 can store one or more applications or data. The memory 302 can be used for transient storage or persistent storage. The application stored in the memory 302 can include one or more modules (not shown in the figure), and each module can include a series of computer-executable instructions in the distributed data processing device. Still further, the processor 301 can be configured to communicate with the memory 302, to execute a series of computer-executable instructions in the memory 302 on the distributed data processing device. The distributed data processing device can further include one or more power supplies 303, one or more wired or wireless network interfaces 304, one or more input/output interfaces 305, one or more keyboards 306, etc.

In a specific embodiment, the distributed data processing device includes a memory and one or more programs. The one or more programs are stored in the memory. The one or more programs can include one or more modules. Each module can include a series of computer-executable instructions in the distributed data processing device. One or more processors are configured to execute computer-executable instructions that are included in the one or more programs and that are used to perform the following operations: determining an active vertex set that currently participates in data processing in target graph data, where the target graph data are pre-generated based on event information of a plurality of associated target events, the event information includes a plurality of event elements of the corresponding target events, each vertex of the target graph data corresponds to one of the event elements, and each edge of the target graph data is connected to the vertex with an association relationship; if an external memory of a first distributed node stores any active vertex in the active vertex set, determining a target data processing mode that matches the active vertex set in a plurality of predetermined data processing modes; determining, based on the target data processing mode, a to-be-updated vertex that has the association relationship with the any active vertex; and sending, based on first data of the any active vertex in the external memory, a first update message to a target distributed node in which the to-be-updated vertex is located, so that the target distributed node performs update processing on second data of the to-be-updated vertex in the external memory of the target distributed node based on the first update message.

Optionally, when the computer-executable instructions are executed, the determining, based on the target data processing mode, a to-be-updated vertex that has the association relationship with the any active vertex includes: if it is determined that the target data processing mode is a push data processing mode, determining, based on the egress edge set and the image backup that are stored in the external memory of the first distributed node, a corresponding target egress point existing when the any active vertex serves as the ingress point; and determining the target egress point as the to-be-updated vertex; and the sending, based on first data of the any active vertex in the external memory, a first update message to a target distributed node in which the to-be-updated vertex is located includes: obtaining the first data of the any active vertex from the external memory of the first distributed node; determining a target distributed node in which the to-be-updated vertex and an image backup of the to-be-updated vertex are located; and sending the first update message to the target distributed node based on vertex information of the any active vertex and the first data.

Optionally, when the computer-executable instructions are executed, the method further includes: determining an active vertex corresponding to the vertex information in the first update message as a target active vertex if the first update message sent by the first distributed node and/or another distributed node is received; determining, based on the egress edge set stored in the external memory of the first distributed node, at least one corresponding target egress point existing when the target active vertex serves as the ingress point; and performing update processing on second data of the target egress point in the external memory of the first distributed node based on the first data in the first update message.

Optionally, when the computer-executable instructions are executed, the determining, based on the target data processing mode, a to-be-updated vertex that has the association relationship with the any active vertex includes: if the target data processing mode is a pull data processing mode, determining a to-be-processed vertex from an egress node and an ingress node that correspond to each ingress edge in the ingress edge set stored in the external memory of the first distributed node; determining, based on the ingress edge set stored in the external memory of the first distributed node, a corresponding target ingress point existing when each to-be-processed vertex serves as an egress point; determining whether the any active vertex includes the target ingress point; and determining the corresponding to-be-processed vertex as a to-be-updated vertex if the any active vertex includes the target ingress point.

Optionally, when the computer-executable instructions are executed, the sending, based on first data of the any active vertex in the external memory, a first update message to a target distributed node in which the to-be-updated vertex is located includes: generating temporary update data of the corresponding to-be-updated vertex based on the first data of the any active vertex in the external memory of the first distributed node; and sending, based on vertex information of the to-be-updated vertex and the temporary update data, the first update message to the target distributed node in which the to-be-updated vertex is located.

The distributed data processing device provided in an embodiment of this specification determines the active vertex set that currently participates in data processing in the target graph data; if the external memory of the first distributed node stores the any active vertex in the active vertex set, determines the target data processing mode that matches the active vertex set in the plurality of predetermined data processing modes; determines, based on the target data processing mode, the to-be-updated vertex that has the association relationship with the any active vertex; and sends, based on the first data of the any active vertex in the external memory, the first update message to the target distributed node in which the to-be-updated vertex is located, so that the target distributed node performs update processing on the second data of the to-be-updated vertex in the external memory of the target distributed node based on the first update message. Therefore, the target graph data are generated based on the event information of the plurality of associated target events, and data processing is performed based on the target graph data, to not only implement effective association of data in big data and centralized processing of associated data and avoid data omission, but also improve data processing efficiency. A distributed data processing system is used, and related data of the target graph data are stored in an external memory of each distributed node, to not only implement effective expansion of a memory, but also satisfy big data processing need and ensure data processing efficiency, because the distributed node can perform data processing in parallel. In addition, the distributed data processing system supports a plurality of data processing modes, and a target data processing mode that matches a current active vertex set is determined, to not only improve data processing performance of the distributed data processing system, but also further improve data processing efficiency.

It is worthwhile to note that the embodiments of the distributed data processing device in this specification and the embodiments of the distributed data processing method in this specification are based on the same invention concept. Therefore, for specific implementation of the embodiments, references can be made to the implementation of the distributed data processing method, and details are not repeatedly described here.

Further, corresponding to the distributed data processing method, based on the same technical concept, an embodiment of this specification further provides a storage medium, configured to store computer-executable instructions. In a specific embodiment, the storage medium can be a universal serial bus (USB) flash drive, an optical disc, a hard disk, etc. When the computer-executable instructions stored in the storage medium are executed by a processor, the following procedure can be performed: determining an active vertex set that currently participates in data processing in target graph data, where the target graph data are pre-generated based on event information of a plurality of associated target events, the event information includes a plurality of event elements of the corresponding target events, each vertex of the target graph data corresponds to one of the event elements, and each edge of the target graph data is connected to the vertex with an association relationship; if an external memory of a first distributed node stores any active vertex in the active vertex set, determining a target data processing mode that matches the active vertex set in a plurality of predetermined data processing modes; determining, based on the target data processing mode, a to-be-updated vertex that has the association relationship with the any active vertex; and sending, based on first data of the any active vertex in the external memory, a first update message to a target distributed node in which the to-be-updated vertex is located, so that the target distributed node performs update processing on second data of the to-be-updated vertex in the external memory of the target distributed node based on the first update message.

Optionally, when the computer-executable instructions stored in the storage medium are executed by the processor, the determining, based on the target data processing mode, a to-be-updated vertex that has the association relationship with the any active vertex includes: if it is determined that the target data processing mode is a push data processing mode, determining, based on the egress edge set and the image backup that are stored in the external memory of the first distributed node, a corresponding target egress point existing when the any active vertex serves as the ingress point; and determining the target egress point as the to-be-updated vertex; and the sending, based on first data of the any active vertex in the external memory, a first update message to a target distributed node in which the to-be-updated vertex is located includes: obtaining the first data of the any active vertex from the external memory of the first distributed node; determining a target distributed node in which the to-be-updated vertex and an image backup of the to-be-updated vertex are located; and sending the first update message to the target distributed node based on vertex information of the any active vertex and the first data.

Optionally, when the computer-executable instructions stored in the storage medium are executed by the processor, the method further includes: determining an active vertex corresponding to the vertex information in the first update message as a target active vertex if the first update message sent by the first distributed node and/or another distributed node is received; determining, based on the egress edge set stored in the external memory of the first distributed node, at least one corresponding target egress point existing when the target active vertex serves as the ingress point; and performing update processing on second data of the target egress point in the external memory of the first distributed node based on the first data in the first update message.

Optionally, when the computer-executable instructions stored in the storage medium are executed by the processor, the determining, based on the target data processing mode, a to-be-updated vertex that has the association relationship with the any active vertex includes: if the target data processing mode is a pull data processing mode, determining a to-be-processed vertex from an egress node and an ingress node that correspond to each ingress edge in the ingress edge set stored in the external memory of the first distributed node; determining, based on the ingress edge set stored in the external memory of the first distributed node, a corresponding target ingress point existing when each to-be-processed vertex serves as an egress point; determining whether the any active vertex includes the target ingress point; and determining the corresponding to-be-processed vertex as a to-be-updated vertex if the any active vertex includes the target ingress point.

Optionally, when the computer-executable instructions stored in the storage medium are executed by the processor, the sending, based on first data of the any active vertex in the external memory, a first update message to a target distributed node in which the to-be-updated vertex is located includes: generating temporary update data of the corresponding to-be-updated vertex based on the first data of the any active vertex in the external memory of the first distributed node; and sending, based on vertex information of the to-be-updated vertex and the temporary update data, the first update message to the target distributed node in which the to-be-updated vertex is located.

When computer-executable instructions stored in a storage medium provided in an embodiment of this specification are executed by a processor, the following procedure is performed: determining the active vertex set that currently participates in data processing in the target graph data; if the external memory of the first distributed node stores the any active vertex in the active vertex set, determining the target data processing mode that matches the active vertex set in the plurality of predetermined data processing modes; determining, based on the target data processing mode, the to-be-updated vertex that has the association relationship with the any active vertex; and sending, based on the first data of the any active vertex in the external memory, the first update message to the target distributed node in which the to-be-updated vertex is located, so that the target distributed node performs update processing on the second data of the to-be-updated vertex in the external memory of the target distributed node based on the first update message. Therefore, the target graph data are generated based on the event information of the plurality of associated target events, and data processing is performed based on the target graph data, to not only implement effective association of data in big data and centralized processing of associated data and avoid data omission, but also improve data processing efficiency. A distributed data processing system is used, and related data of the target graph data are stored in an external memory of each distributed node, to not only implement effective expansion of a memory, but also satisfy big data processing need and ensure data processing efficiency, because the distributed node can perform data processing in parallel. In addition, the distributed data processing system supports a plurality of data processing modes, and a target data processing mode that matches a current active vertex set is determined, to not only improve data processing performance of the distributed data processing system, but also further improve data processing efficiency.

It is worthwhile to note that the embodiments of the storage medium in this specification and the embodiments of the distributed data processing method in this specification are based on the same invention concept. Therefore, for specific implementation of the embodiments, references can be made to the implementation of the distributed data processing method, and details are not repeatedly described here.

Specific embodiments of this specification are described above. Other embodiments fall within the scope of the appended claims. In some cases, the actions or steps described in the claims can be performed in an order different from that in the embodiments, and the desired results can still be achieved. In addition, the process depicted in the accompanying drawings does not necessarily need a particular sequence or consecutive sequence to achieve the desired results. In some implementations, multitasking and concurrent processing are feasible or may be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method processes can be considered as direct improvements to hardware circuit structures. A designer usually programs an improved method process into a hardware circuit, to obtain a corresponding hardware circuit structure. Therefore, a method process can be improved by using a hardware entity module. For example, a programmable logic device (PLD)

(for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed using the several described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer-readable program code, logic programming can be performed on method steps to enable the controller to implement the same function in forms of the logic gate, the switch, the application-specific integrated circuit, the programmable logic controller, the embedded microcontroller, etc. Therefore, the controller can be considered as a hardware component, and an apparatus included in the controller for implementing various functions can also be considered as a structure in the hardware component. Alternatively, the apparatus for implementing various functions can even be considered as both a software module implementing the method and a structure in the hardware component.

The system, apparatus, module, or unit illustrated in the embodiments can be specifically implemented using a computer chip or an entity, or can be implemented using a product having a certain function. A typical implementation device is a computer. Specifically, the computer can be, for example, a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the above-mentioned apparatus is described by dividing functions into various units. Certainly, when the embodiments of this specification are implemented, functions of the units can be implemented in one or more pieces of software and/or hardware.

A person skilled in the art should understand that embodiments of this specification can be provided as methods, systems, or computer program products. Therefore, the embodiments of this specification can use a form of hardware only embodiments, software only embodiments, or embodiments with a combination of software and hardware. Moreover, this specification can use a form of a computer program product that is implemented on one or more computer-usable storage media (including but not limited to a disk memory, a CD-ROM, an optical memory, etc.) that include computer-usable program code.

This specification is described with reference to the flowcharts and/or block diagrams of the method, the device (system), and the computer program product according to some embodiments of this specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in at least one of one or more processes in the flowcharts and one or more blocks in the block diagrams.

These computer program instructions can be stored in a computer-readable memory that can instruct the computer or the another programmable data processing device to work in a specific way, so the instructions stored in the computer-readable memory generate an artifact that includes an instruction apparatus. The instruction apparatus implements a specific function in at least one of one or more processes in the flowcharts and one or more blocks in the block diagrams.

These computer program instructions can be loaded onto the computer or the another programmable data processing device, so a series of operations and steps are performed on the computer or the another programmable device, thereby generating computer-implemented processing. Therefore, the instructions executed on the computer or the another programmable device provide steps for implementing a specific function in at least one of one or more processes in the flowcharts and one or more blocks in the block diagrams.

In a typical configuration, a computing device includes one or more processors (CPU), an input/output interface, a network interface, and a memory. The memory may include at least one of a non-persistent memory, a random access memory (RAM), and a non-volatile memory in a computer-readable medium, for example, a read-only memory (ROM) or a flash read-only memory (flash RAM). The memory is an example of the computer-readable medium. The computer-readable medium includes a persistent and a non-persistent, a removable and a non-removable medium, which can implement information storage by using any method or technology. The information can be computer-readable instructions, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. As described in this specification, the computer-readable medium does not include computer-readable transitory media (transitory media) such as a modulated data signal and a carrier.

It is worthwhile to further note that, the terms "include", "comprise", or any other variant thereof are intended to cover a non-exclusive inclusion, so a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

The embodiments of this specification can be described in the general context of computer-executable instructions, for example, a program module. Generally, the program module includes a routine, a program, an object, a component, a data structure, etc. executing a specific task or implementing a specific abstract data type. An embodiment of this specification also be practiced in a distributed computing environment. In the distributed computing environment, tasks are performed by remote processing devices that are connected through a communications network. In the distributed computing environments, the program module can be located in local and remote computer storage media including storage devices.

The embodiments in this specification are described in a progressive way. For same or similar parts of the embodiments, reference can be made to the embodiments mutually. Each embodiment focuses on a difference from other embodiments. Particularly, a system embodiment is similar to a method embodiment, and therefore is described briefly. For related parts, reference can be made to partial descriptions in the method embodiment.

The previous descriptions are merely embodiments of this specification, and are not intended to limit this specification. A person skilled in the art can make various modifications and changes to this specification. Any modification, equivalent replacement, or improvement made without departing from the spirit and principle of this specification shall fall within the scope of the claims in this specification.

The invention claimed is:

1. A distributed data processing method, comprising:
receiving shard data and attribute information of target graph data sent by a specified device, wherein the shard data are obtained by the specified device based on performing division processing on the target graph data in a predetermined data division manner; and
storing the shard data and the attribute information in an external memory of a first distributed node;
determining an active vertex set that currently participates in data processing in the target graph data, wherein the target graph data are pre-generated based on event information of a plurality of target events, the event information comprises a plurality of event elements corresponding to the target events, each vertex of the target graph data corresponds to one of the plurality of event elements, and each edge of the target graph data is connected to the vertex according to an association relationship;
in response to determining that the external memory of the first distributed node stores an active vertex in the active vertex set, determining, from a plurality of predetermined data processing modes, a target data processing mode that matches the active vertex set;
determining, based on the target data processing mode, a to-be-updated vertex according to the association relationship with the active vertex; and
sending, based on first data of the active vertex in the external memory, a first update message to a target distributed node in which the to-be-updated vertex is located for the target distributed node to perform, based on the first update message, update processing on second data of the to-be-updated vertex in an external memory of the target distributed node.

2. The method according to claim 1, wherein the vertex comprises an ingress point and an egress point, each edge in the target graph data is determined as a directed edge, the directed edge points from the ingress point to the egress point, the directed edge is an egress edge of the ingress point, and the directed edge is an ingress edge of the egress point; wherein
the shard data comprise a vertex subset, an ingress edge set corresponding to an ingress edge of each vertex in the vertex subset, an egress edge set corresponding to an egress edge of each vertex in the vertex subset, a primary backup of each vertex in the vertex subset, and an image backup of a vertex that forms the directed edge with each vertex in the vertex subset, the primary backup comprises element data of an event element corresponding to a vertex, and the image backup is used to transfer a message; and wherein
the attribute information comprises a first quantity of edges of the target graph data and a second quantity of egress edges of each vertex in the target graph data.

3. The method according to claim 2, wherein the determining a target data processing mode that matches the active vertex set in a plurality of predetermined data processing modes comprises:
calculating density of the active vertex set in a predetermined calculation manner; and
determining, based on the density, the target data processing mode that matches the active vertex set in a predetermined push data processing mode and a predetermined pull data processing mode.

4. The method according to claim 3, wherein the calculating density of the active vertex set in a predetermined calculation manner comprises:
counting a third quantity of active vertexes in the active vertex set;
counting a total quantity of egress edges of each active vertex in the active vertex set based on the second quantity;
determining the total quantity as a fourth quantity; and
calculating the density of the active vertex set based on the third quantity and the fourth quantity in the predetermined calculation manner; and wherein
the determining, based on the density, the target data processing mode that matches the active vertex set in a predetermined push data processing mode and a predetermined pull data processing mode comprises:
determining contrast density based on the first quantity;
determining whether the density of the active vertex set is greater than or equal to the contrast density;

in response to determining that the density of the active vertex set is greater than or equal to the contrast density, determining the pull data processing mode as the target data processing mode; and in response to determining that the density of the active vertex set is less than the contrast density, determining the push data processing mode as the target data processing mode.

5. The method according to claim 3, wherein the determining, based on the target data processing mode, a to-be-updated vertex has according to the association relationship with the active vertex comprises:

in response to determining that the target data processing mode is the push data processing mode, determining, based on the egress edge set and the image backup that are stored in the external memory of the first distributed node, that a corresponding target egress point exists when the active vertex serves as the ingress point; and determining the target egress point as the to-be-updated vertex; and wherein the sending, based on first data of the any active vertex in the external memory, a first update message to a target distributed node in which the to-be-updated vertex is located comprises:

obtaining the first data of the active vertex from the external memory of the first distributed node;

determining a target distributed node in which the to-be-updated vertex and an image backup of the to-be-updated vertex are located; and sending the first update message to the target distributed node based on vertex information of the active vertex and the first data.

6. The method according to claim 5, wherein the method further comprises:

determining an active vertex corresponding to the vertex information in the first update message as a target active vertex if the first update message sent by the first distributed node or another distributed node is received;

determining, based on the egress edge set stored in the external memory of the first distributed node, that at least one corresponding target egress point exists when the target active vertex serves as the ingress point; and performing update processing on second data of the target egress point in the external memory of the first distributed node based on the first data in the first update message.

7. The method according to claim 6, wherein the performing update processing on second data of the target egress point in the external memory of the first distributed node comprises:

determining a target thread corresponding to each target egress point; and sending the first update message to the corresponding target thread for the target thread to perform, based on the first data in the first update message, update processing on the second data of the corresponding target egress point in the external memory of the first distributed node.

8. The method according to claim 7, wherein the sending the first update message to the corresponding target thread comprises:

determining whether the second data of the target egress point is in a locked state;

in response to determining that the second data is in the locked state, storing the first update message in a message queue of the corresponding target egress point, so that the target thread corresponding to the target egress point obtains the first update message from the message queue after performing unlocking processing on the second data, and performs update processing on the second data based on the first data in the first update message after performing locking processing on the second data; and in response to determining that the second data is not in the locked state, sending the first update message to the corresponding target thread, so that after performing locking processing on the second data of the target egress point, the target thread performs updating processing on the second data of the target egress point based on the first data in the first update message, and performs unlocking processing on the second data after updating is completed.

9. The method according to claim 3, wherein the determining, based on the target data processing mode, a to-be-updated vertex has according to the association relationship with the active vertex comprises:

in response to determining that the target data processing mode is the pull data processing mode, determining a to-be-processed vertex from an egress node and an ingress node that correspond to each ingress edge in the ingress edge set stored in the external memory of the first distributed node;

determining, based on the ingress edge set stored in the external memory of the first distributed node, that a corresponding target ingress point exists when each to-be-processed vertex serves as an egress point;

determining whether the active vertex comprises the target ingress point; and determining the corresponding to-be-processed vertex as a to-be-updated vertex if the active vertex comprises the target ingress point.

10. The method according to claim 9, wherein the sending, based on first data of the any active vertex in the external memory, a first update message to a target distributed node in which the to-be-updated vertex is located comprises:

generating temporary update data of the corresponding to-be-updated vertex based on the first data of the active vertex in the external memory of the first distributed node; and sending, based on vertex information of the to-be-updated vertex and the temporary update data, the first update message to the target distributed node in which the to-be-updated vertex is located.

11. The method according to claim 10, wherein the method further comprises:

determining the to-be-updated vertex based on vertex information in the first update message if the first update message sent by the first distributed node or another distributed node is received; and performing update processing on the second data of the to-be-updated vertex in the external memory of the first distributed node based on the temporary update data in the first update message.

12. The method according to claim 1, wherein the determining, based on the target data processing mode, a to-be-updated vertex according to the association relationship with the active vertex comprises:

invoking a first function;

determining, based on the first function and the target data processing mode, the to-be-updated vertex according to the association relationship with the any active vertex; and wherein the sending, based on first data of the any active vertex in the external memory, a first update message to a target distributed node in which the to-be-updated vertex is located comprises:
sending, based on the first function and the first data of the any active vertex in the external memory, the first update message to the target distributed node in which the to-be-updated vertex is located for the target distributed node to invoke a second function, and performs update processing on the second data of the to-be-updated vertex in the external memory of the target distributed node based on the second function and the first update message.

13. The method according to claim 1, wherein after the sending, based on first data of the any active vertex in the external memory, a first update message to a target distributed node in which the to-be-updated vertex is located, the method further comprises:
in response to determining that the first update message is received, determining whether a predetermined iteration stop condition is satisfied after update processing is completed;
in response to determining that the predetermined iteration stop condition is not satisfied:
determining the to-be-updated vertex as a new active vertex;
sending, based on vertex information of the new active vertex, a second update message to each distributed node in a distributed system in which the first distributed node is located;
receiving the second update message sent by the target distributed node; and
determining the new active vertex corresponding to the received second update message as the active vertex set that currently participates in data processing in the target graph data.

14. The method according to claim 1, wherein before the determining an active vertex set that currently participates in data processing in target graph data, the method further comprises:
in response to determining that the first distributed node has preprocessing permission, performing division processing on the target graph data in a predetermined data division manner to obtain shard data to be allocated to each distributed node in a distributed system in which the first distributed node is located; and
sending the shard data and attribute information of the target graph data to each distributed node in the distributed system for the distributed node to store the shard data and the attribute information in the external memory.

15. A distributed data processing apparatus, comprising: at least one processor; and
one or more memories couple to the at least one processor and storing programming instructions for execution by the at least one processor to perform operations comprising:
receiving shard data and attribute information of target graph data sent by a specified device, wherein the shard data are obtained by the specified device based on performing division processing on the target graph data in a predetermined data division manner; and
storing the shard data and the attribute information in an external memory of a first distributed node:
determining an active vertex set that currently participates in data processing in the target graph data, wherein the target graph data are pre-generated based on event information of a plurality of target events, the event information comprises a plurality of event elements corresponding to the target events, each vertex of the target graph data corresponds to one of the plurality of event elements, and each edge of the target graph data is connected to the vertex according to an association relationship;
in response to determining that the external memory of the first distributed node stores an active vertex in the active vertex set, determining, from a plurality of predetermined data processing modes, a target data processing mode that matches the active vertex set;
determining, based on the target data processing mode, a to-be-updated vertex according to the association relationship with the active vertex; and
sending, based on first data of the active vertex in the external memory, a first update message to a target distributed node in which the to-be-updated vertex is located for the target distributed node to perform, based on the first update message, update processing on second data of the to-be-updated vertex in an external memory of the target distributed node.

16. The apparatus according to claim 15, wherein the vertex comprises an ingress point and an egress point, each edge in the target graph data is determined as a directed edge, the directed edge points from the ingress point to the egress point, the directed edge is an egress edge of the ingress point, and the directed edge is an ingress edge of the egress point; wherein
the shard data comprise a vertex subset, an ingress edge set corresponding to an ingress edge of each vertex in the vertex subset, an egress edge set corresponding to an egress edge of each vertex in the vertex subset, a primary backup of each vertex in the vertex subset, and an image backup of a vertex that forms the directed edge with each vertex in the vertex subset, the primary backup comprises element data of an event element corresponding to a vertex, and the image backup is used to transfer a message; and wherein
the attribute information comprises a first quantity of edges of the target graph data and a second quantity of egress edges of each vertex in the target graph data.

17. The apparatus according to claim 16, wherein the determining a target data processing mode that matches the active vertex set in a plurality of predetermined data processing modes comprises:
calculating density of the active vertex set in a predetermined calculation manner; and
determining, based on the density, the target data processing mode that matches the active vertex set in a predetermined push data processing mode and a predetermined pull data processing mode.

18. A non-transitory, computer-readable medium storing one or more instructions executable by a computer system to perform operations comprising:
receiving shard data and attribute information of target graph data sent by a specified device, wherein the shard data are obtained by the specified device based on performing division processing on the target graph data in a predetermined data division manner; and
storing the shard data and the attribute information in an external memory of a first distributed node;
determining an active vertex set that currently participates in data processing in the target graph data, wherein the target graph data are pre-generated based on event information of a plurality of target events, the event information comprises a plurality of event elements corresponding to the target events, each vertex of the target graph data corresponds to one of the plurality of event elements, and each edge of the target graph data is connected to the vertex according to an association relationship;

in response to determining that the external memory of the first distributed node stores an active vertex in the active vertex set, determining, from a plurality of predetermined data processing modes, a target data processing mode that matches the active vertex set;

determining, based on the target data processing mode, a to-be-updated vertex according to the association relationship with the active vertex; and sending, based on first data of the active vertex in the external memory, a first update message to a target distributed node in which the to-be-updated vertex is located for the target distributed node to perform, based on the first update message, update processing on second data of the to-be-updated vertex in an external memory of the target distributed node.

* * * * *